May 15, 1934.    F. H. BOGART    1,958,530
MACHINE TOOL FOR MACHINING COUPLINGS AND THE LIKE
Filed April 26, 1929    12 Sheets-Sheet 1
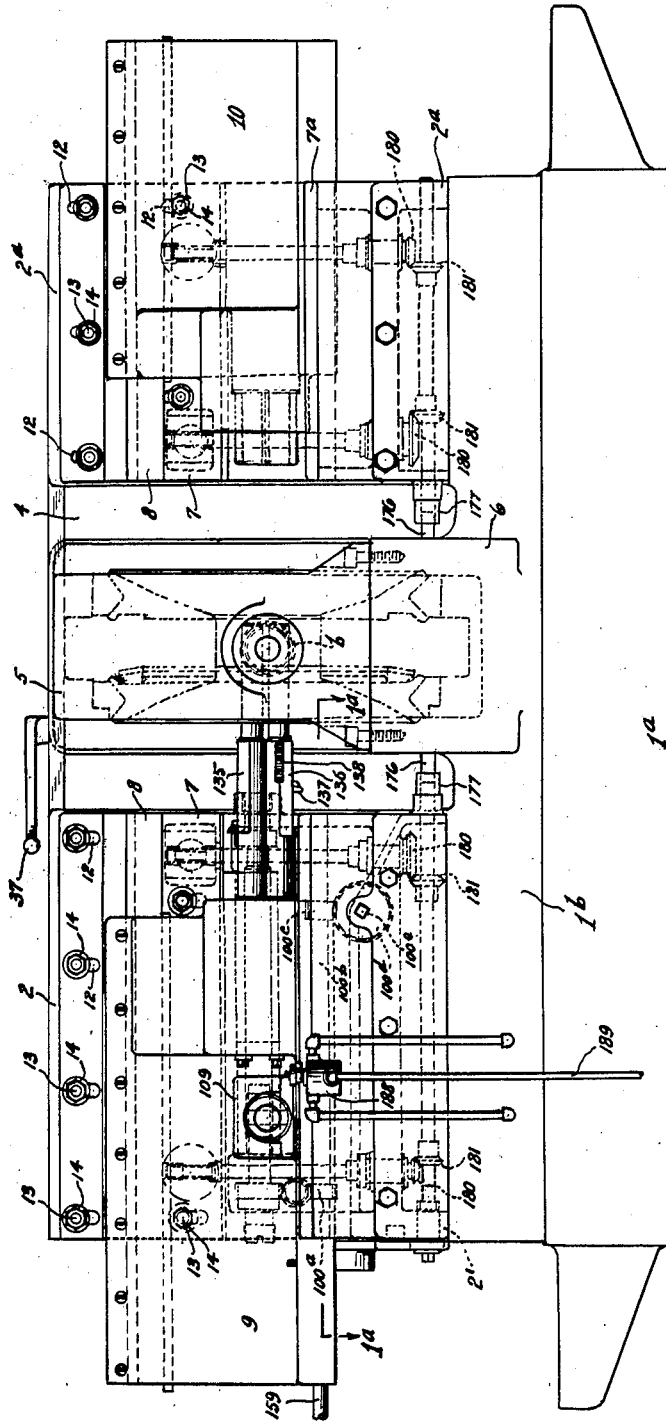
INVENTOR
Fred H. Bogart
Kwis Hudson & Kent
ATTORNEYS May 15, 1934. F. H. BOGART 1,958,530
MACHINE TOOL FOR MACHINING COUPLINGS AND THE LIKE
Filed April 26, 1929 12 Sheets-Sheet 2
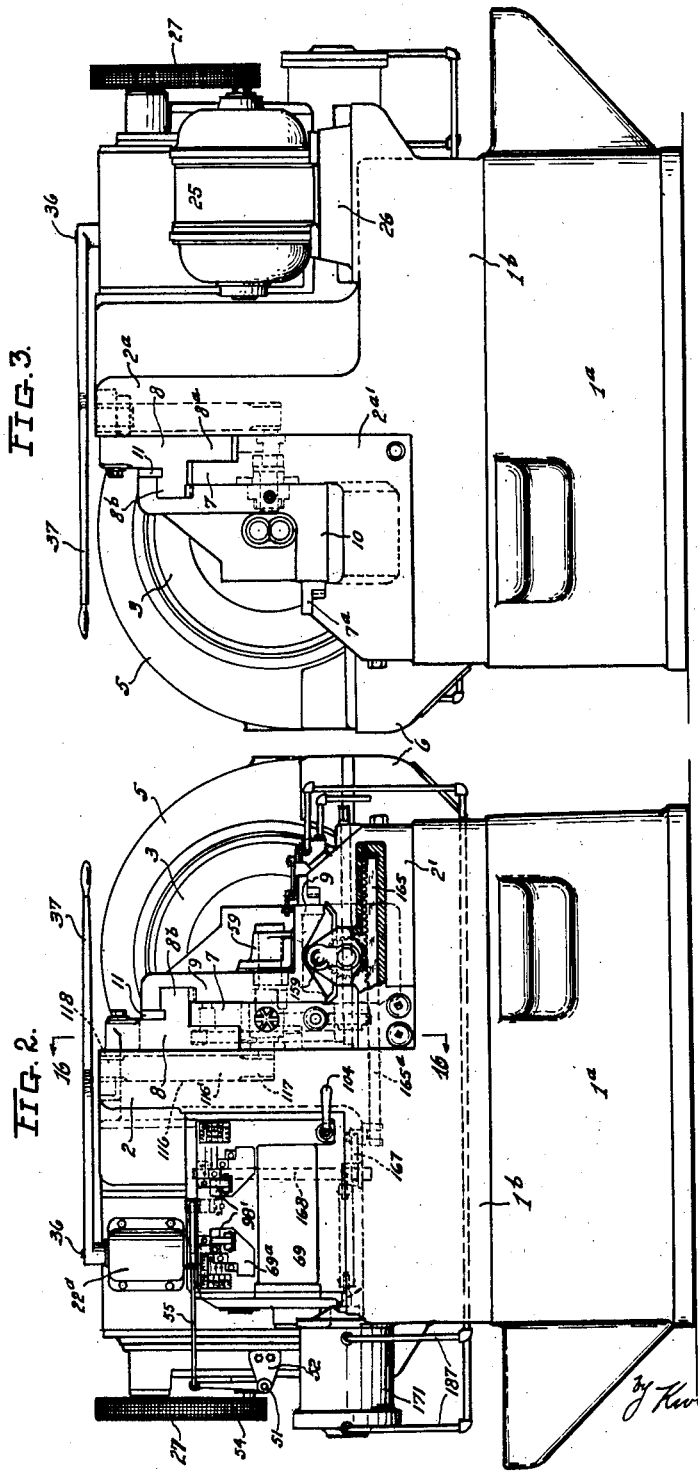
INVENTOR
Fred H. Bogart
ATTORNEYS

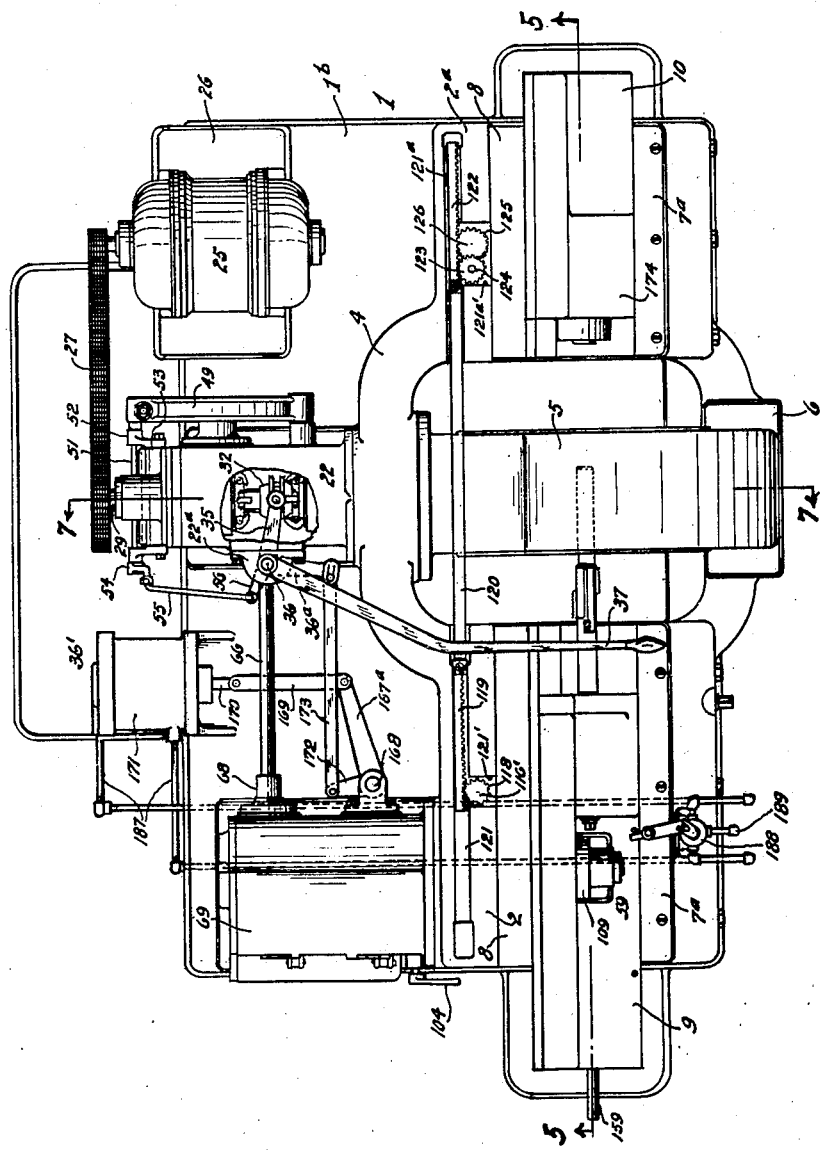

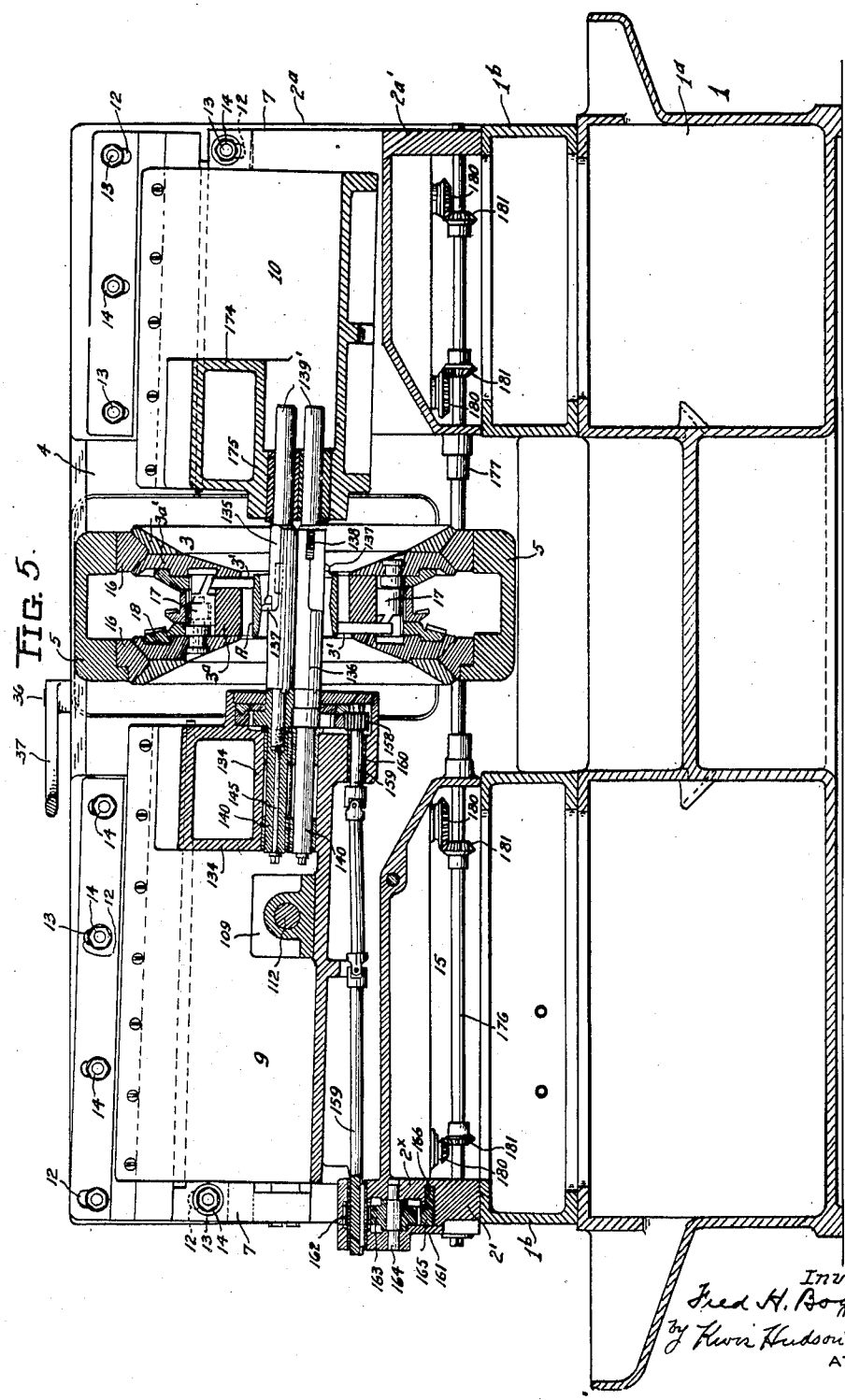

May 15, 1934.  F. H. BOGART  1,958,530
MACHINE TOOL FOR MACHINING COUPLINGS AND THE LIKE
Filed April 26, 1929  12 Sheets-Sheet 6
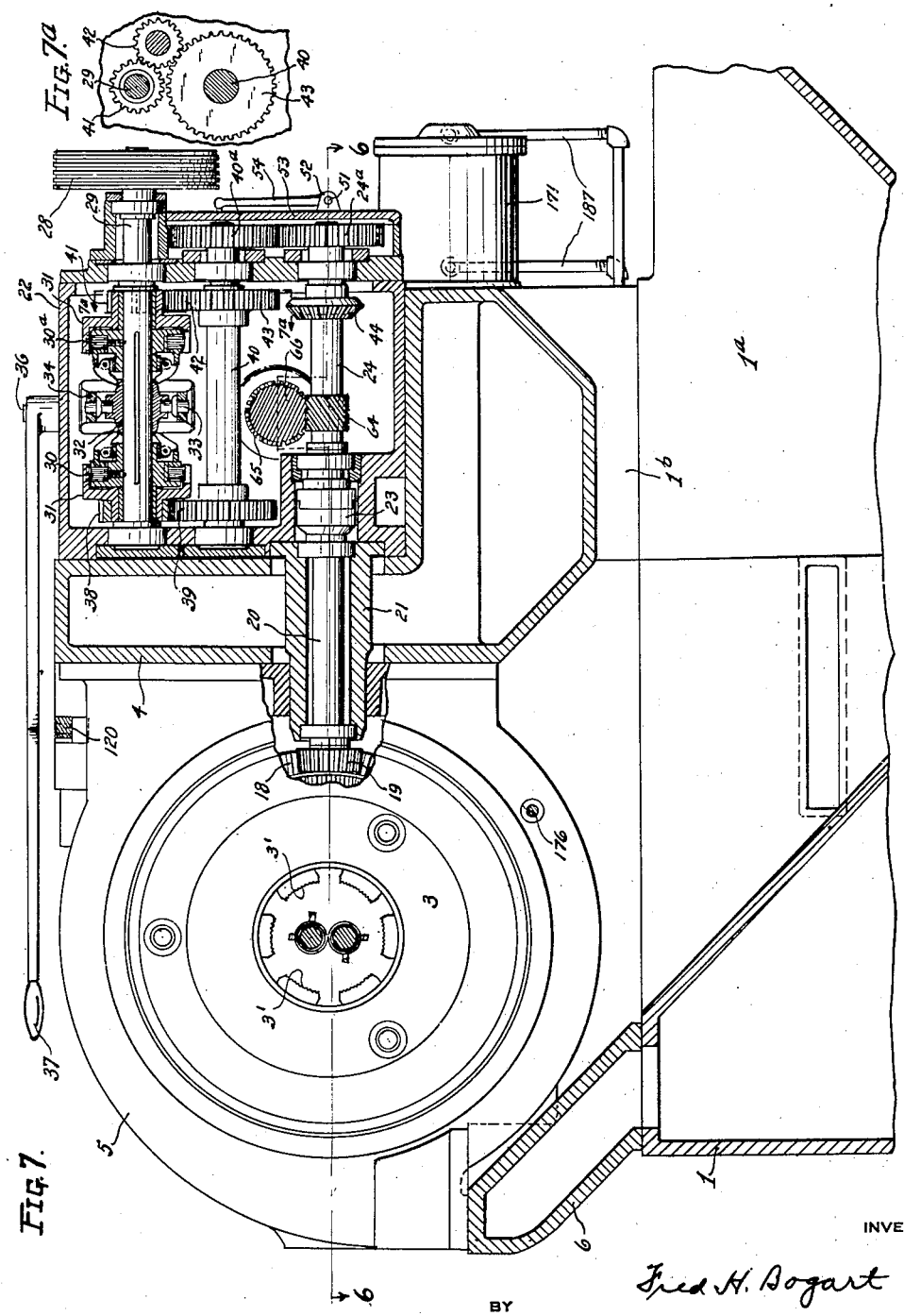
INVENTOR
Fred H. Bogart
BY
Kwis Hudson & Kent
ATTORNEYS

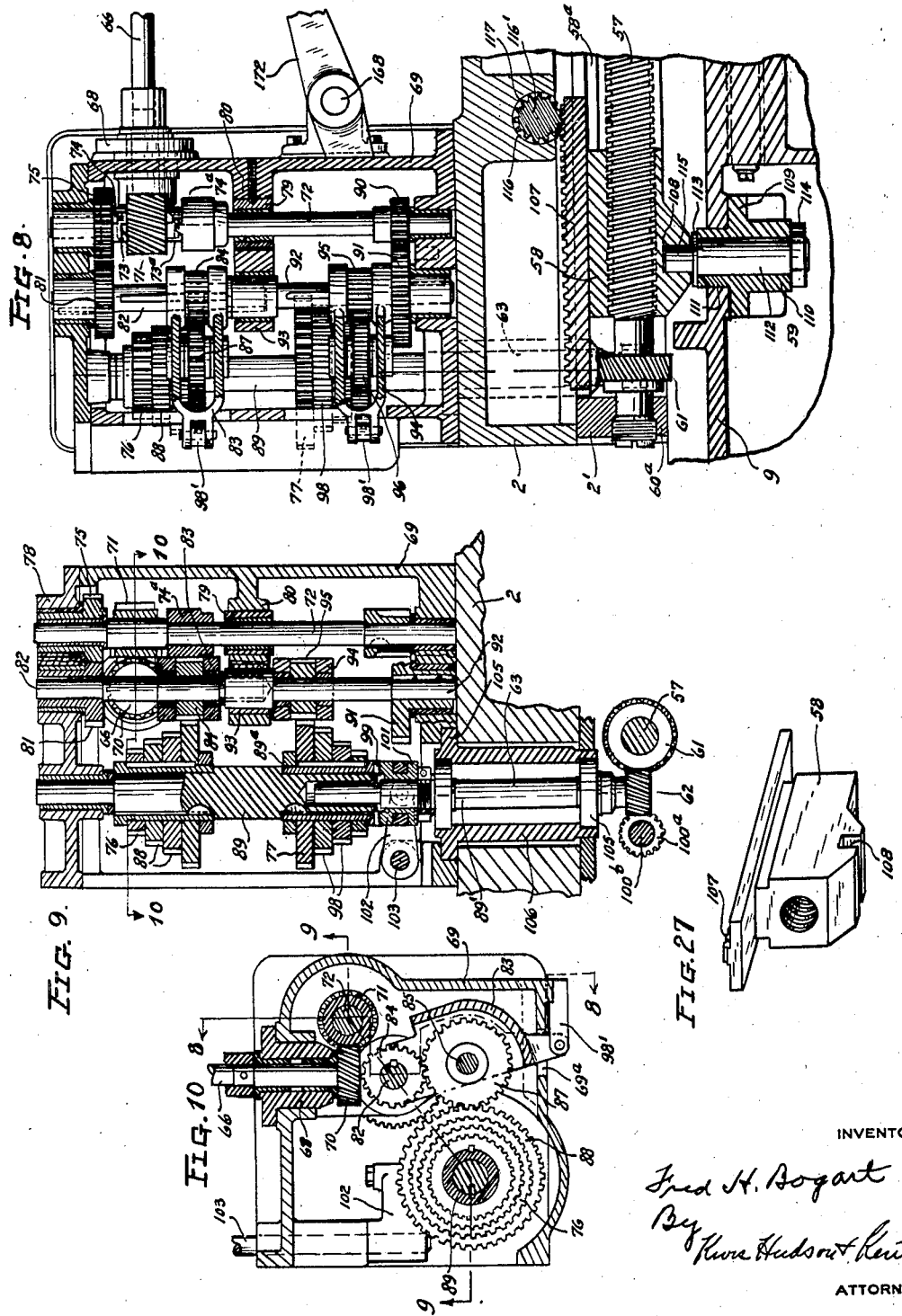

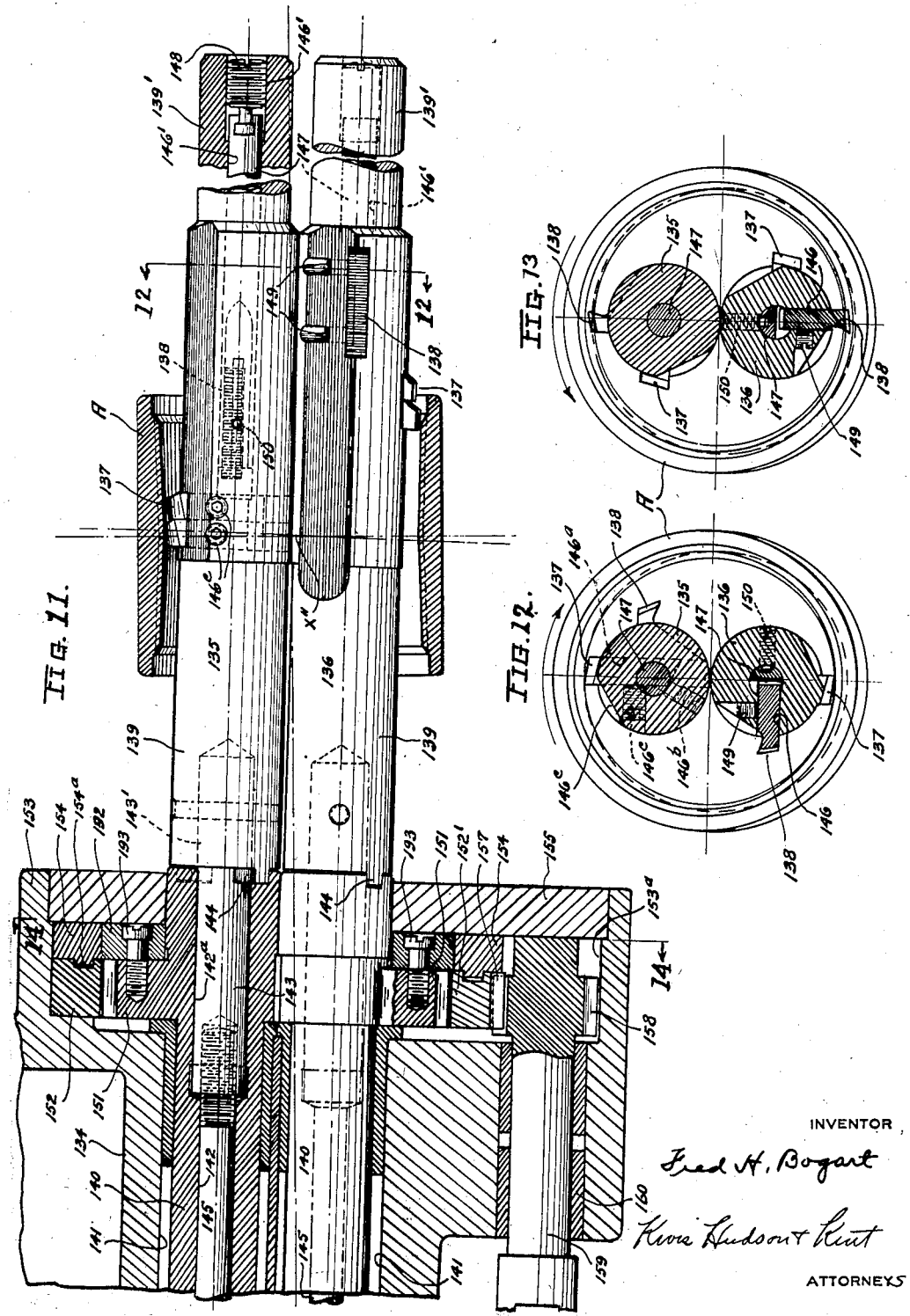

May 15, 1934. F. H. BOGART 1,958,530
MACHINE TOOL FOR MACHINING COUPLINGS AND THE LIKE
Filed April 26, 1929 12 Sheets-Sheet 9

INVENTOR
Fred H. Bogart
BY
Kwon Hudson & Kent
ATTORNEYS

May 15, 1934.  F. H. BOGART  1,958,530
MACHINE TOOL FOR MACHINING COUPLINGS AND THE LIKE
Filed April 26, 1929  12 Sheets-Sheet 10
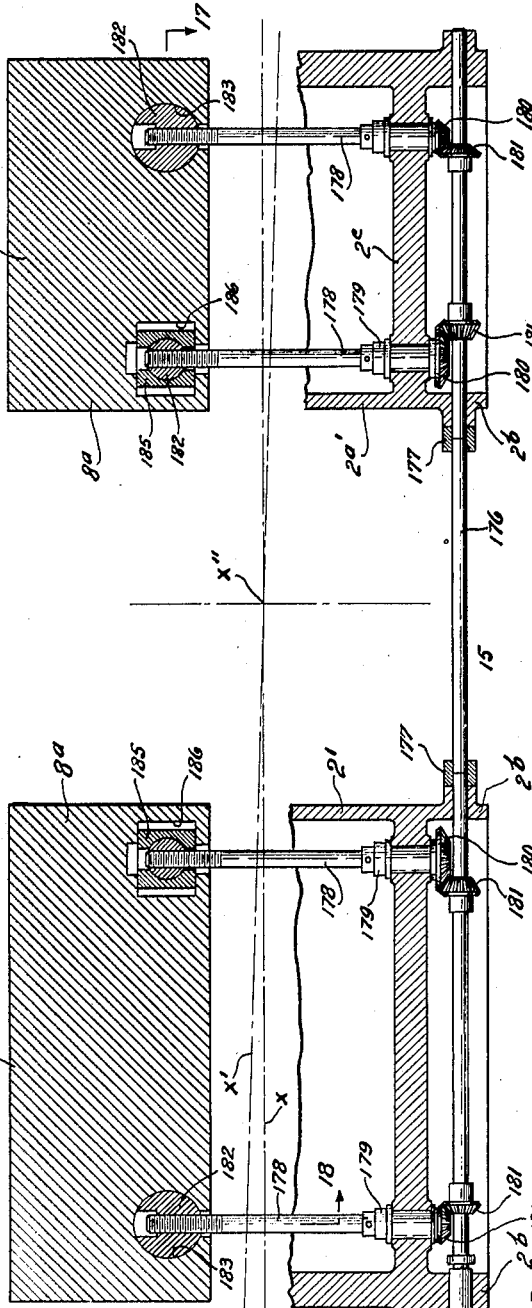
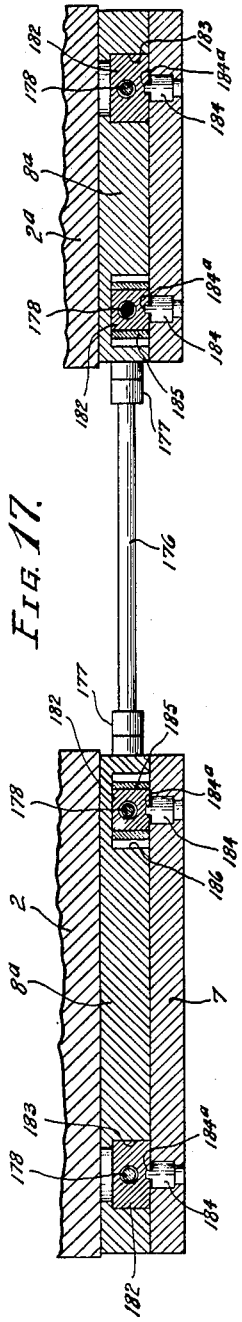
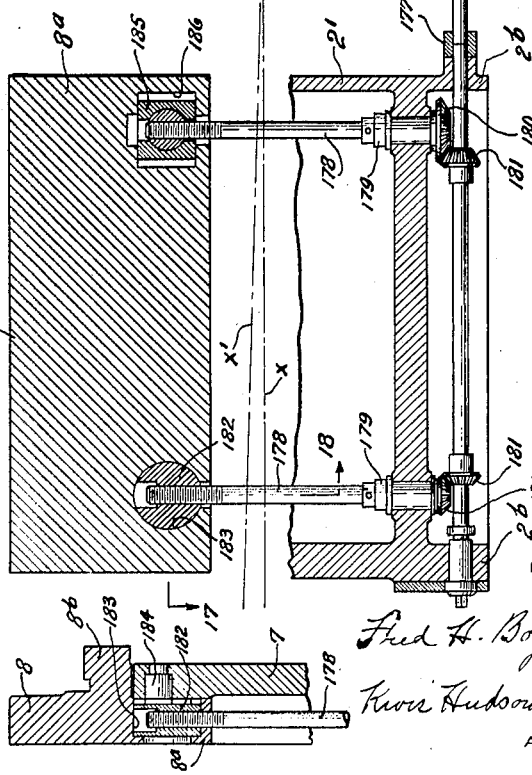
INVENTOR
Fred H. Bogart
Knox Hudson & Kent
ATTORNEYS

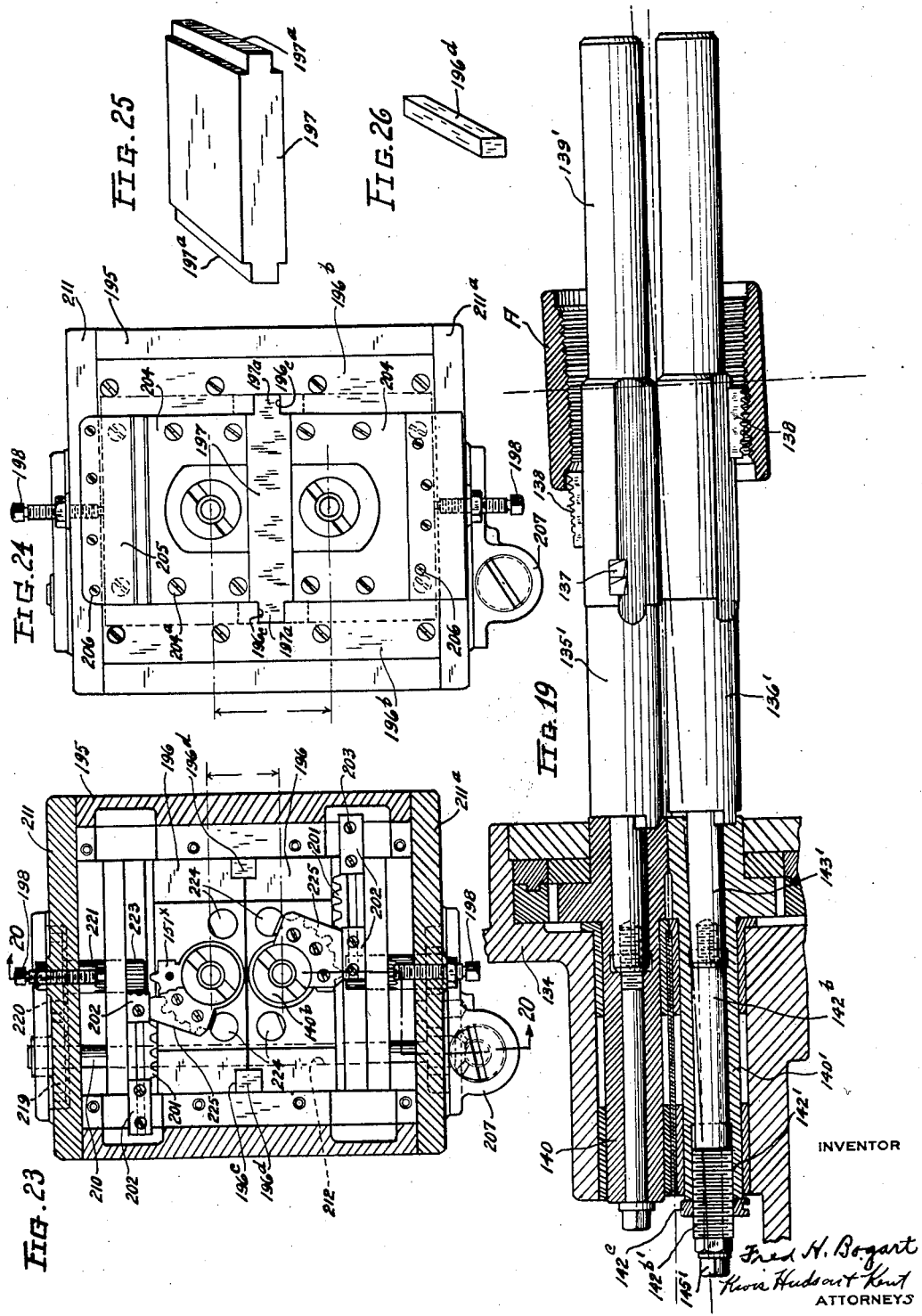

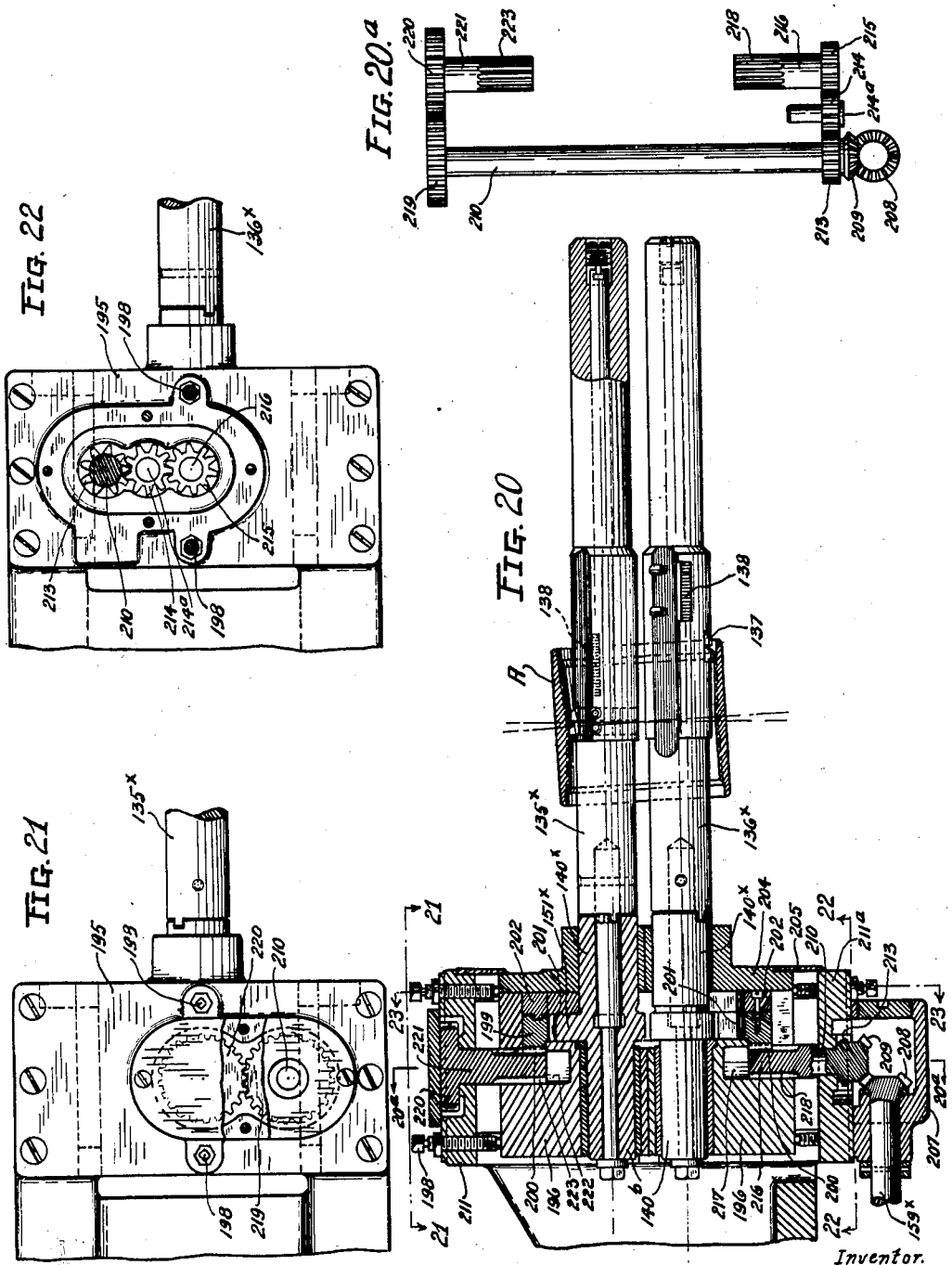

Patented May 15, 1934

1,958,530

UNITED STATES PATENT OFFICE 1,958,530

MACHINE TOOL FOR MACHINING COUPLINGS AND THE LIKE

Fred H. Bogart, Cleveland Heights, Ohio, assignor to The Warner & Swasey Company, Cleveland, Ohio, a corporation of Ohio Application April 26, 1929, Serial No. 358,220

55 Claims. (Cl. 10—128)

This invention relates to a machine for and process of boring or machining and threading members or devices, either with non-tapered or tapered portions, for example, flanged members which are internally threaded, and annular members or devices having internal or external threads, used for coupling together, end to end, piping or tubing, bars, rods and other elements.

One object of the invention is to provide an improved process of machining and threading an annular member which is to have straight or tapered threaded portion or portions, whereby the excess metal of the member is first cut away or removed and then such machined surface or surfaces are threaded, to the end that time and labor are saved and greater accuracy results.

Another object of the invention is to provide an improved machine for surfacing and threading an annular member with one mounting of the member in the chuck of the machine, whereby eccentricity and disalignment of the surfaced portions and threaded surfaces are eliminated and great accuracy of the threaded surfaces and the threads thereof results.

Another object of the invention is to provide an improved machine capable of simultaneously boring the opposite tapered halves of a coupling and simultaneously threading the two halves in a rapid and economical manner and with relatively great accuracy.

Another object of the invention is to provide an improved machine of this character capable of providing on the surface of an annular member threads of varying pitch and on surface or surfaces tapered to varying degrees.

Another object of the invention is to provide means for adjusting the tool guides, whereby the tool or tools may move in a plane parallel to the axis of the chuck or at an angle to such axis to effect boring or machining and threading on any desired taper relative to the axis of the work.

A further object of the invention is to provide a machine of this character having a compound or multi-tool for effecting boring and threading and slidable supports for such tool at opposite sides of the work holder, whereby deflection of the tool while either tool element is in action is minimized and the work may be bored and threaded with relatively great accuracy.

Another object of the invention is to provide in a machine having tool supports at opposite sides of the work holder, improved means for adjusting both guides for the tool supports simultaneously at an angle to the axis of the chuck while maintaining substantially a fixed relation of the tool elements to the point of intersection of such axis by a plane at right angles to the axis of the work holder and work piece at the center thereof.

A further object of the invention is to provide in a machine of this character a compound tool capable of (1) boring or otherwise surfacing a work piece when moving in one direction and (2) threading or otherwise machining the work piece when moving in the opposite direction, and means for selectively controlling the tool to position the desired tool element or elements in active relation to the work piece accordingly as the tool moves in one direction or the other.

Other objects of the invention will be apparent to those skilled in the art to which my invention relates from the following description taken in connection with the accompanying drawings, wherein Fig. 1 is a front elevation of a machine embodying my invention and capable of carrying out my improved process; the slides being positioned in longitudinal alignment.

Fig. 1ª is a fragmentary section on line 1ª—1ª of Fig. 1.

Fig. 2 is an end elevation looking toward the right of Fig. 1, parts being broken away.

Fig. 3 is an end elevation looking toward the left of Fig. 1.

Fig. 4 is a plan view of the machine, parts being broken away.

Fig. 5 is a section on the line 5—5 of Fig. 4; the guides for the slides being adjusted so that an imaginary line midway between the tool carrying members intersects the axis of the work at the point of intersection of a plane at right angles to the axis centrally of the chuck.

Fig. 7 is a section on the line 7—7 of Fig. 4.

Fig. 7ª is a fragmentary section on line 7ª—7ª of Fig. 7.

Fig. 8 is a section on the line 8—8 of Fig. 10.

Fig. 9 is a section on the line 9—9 of Fig. 10.

Fig. 10 is a section on the line 10—10 of Fig. 9.

Figure 14:
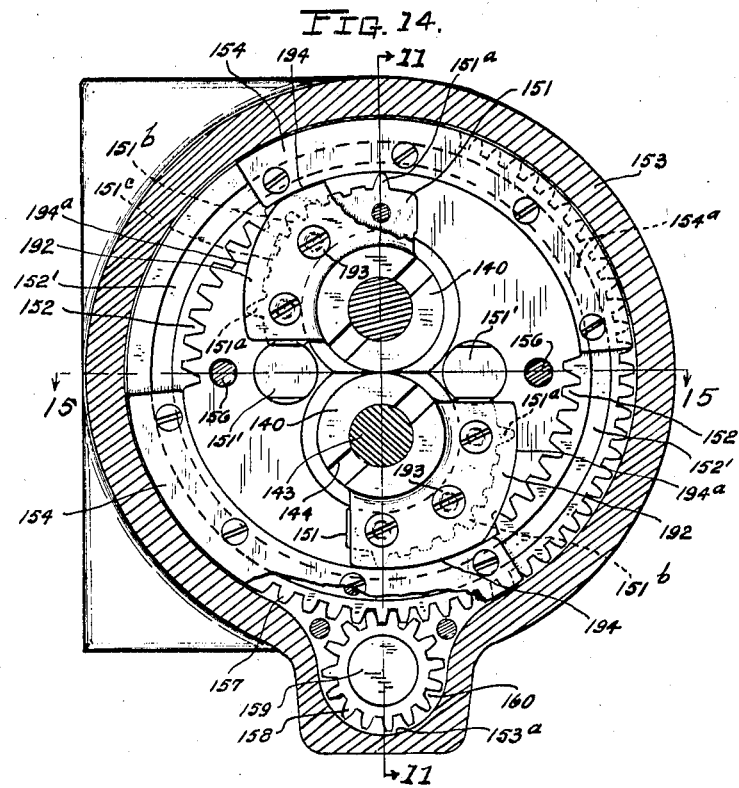

Fig. 11 is a section on the line 11—11 of Fig. 14, showing a coupling in position (the chuck being omitted); the tool carrying members being shown supported in the same position as illustrated in Fig. 5, and showing them at the end of the boring operation.

Fig. 12 is a section on the line 12—12 of Fig. 11, showing the boring tool elements in active position and the threading or thread chasing elements in an inactive position.

Fig. 13 is a view similar to Fig. 12, but showing the tool carrying members rotated a quarter turn or 90 degrees to move the threading elements into active position.

Figure 15:
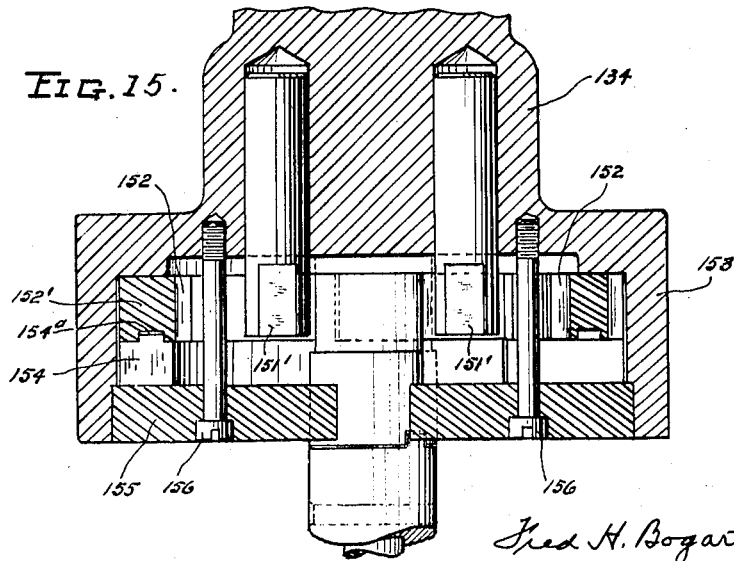

Fig. 14 is a section on the line 14—14 of Fig. 11.
Fig. 15 is a section on the line 15—15 of Fig. 14.
Fig. 16 is a fragmentary section on the line 16—16 of Fig. 2.
Figs. 17 and 18 are sections on the lines 17—17 and 18—18, respectively, of Fig. 16.
Fig. 19 is a fragmentary sectional view showing a head for supporting the tool carrying members and tool carrying members mounted thereon of slightly different construction, wherein one of the tool carrying members is movable or adjustable endwise, so that its tool elements may be adjusted relative to the respective tool elements on the other tool carrying member.
Fig. 20 is a fragmentary sectional view, on the line 20—20 of Fig. 23, showing a head for supporting the tool carrying members wherein the latter may be adjusted laterally toward or away from each other.
Fig. 20$^a$ is a section on line 20$^a$—20$^a$ of Fig. 20, showing the shafting and gearing only.
Fig. 21 is a view on the line 21—21 of Fig. 20.
Fig. 22 is a section on the line 22—22 of Fig. 20.
Fig. 23 is a section on the line 23—23 of Fig. 20.
Fig. 24 is an elevation looking toward the left of Fig. 20, but showing the supporting blocks for the tool carrying members adjusted away from each other with a spacing member between them.
Fig. 25 is a perspective of the spacing member shown in Fig. 24.
Fig. 26 is a perspective view of a key used for determining the position of the supporting blocks when adjusted into face to face relation as in Fig. 23.
Fig. 27 is a perspective view of the nut for feeding the tool slide.

My invention in one of its aspects relates to a machine wherein, during the forward and backward travel of the tool carrying member, different machining operations are performed on a work piece, either internally or externally thereof. They may comprise two surfacing operations or one surfacing and a threading operation.

In other aspects, my invention has to do with the removal of excess metal from the wall of an annular member throughout that portion or portions of its surface which is or are to be threaded and the provision on such surface or surfaces, which may be cylindrical or tapered to any desired degree, of threads of any predetermined pitch. In the disclosed or preferred construction, these operations are effected internally of the member, for which reason the first operation or step on the work-piece is termed a boring operation, but in the use of the term boring I do not wish to be limited thereby, as the invention comprehends and may be adapted to the machining or surfacing and threading of the external wall of the member, as above stated.

In the drawings, 1 indicates as an entirety a frame preferably comprising a lower base section 1$^a$ serving as a main support and a reservoir for a suitable refrigerant and a receiver for the resulting metal chips and an upper base section 1$^b$, mounted on the lower base section 1$^a$ and serving to support various parts and mechanisms to be later referred to. Intermediate its front and rear edges, the base section 1$^b$ is fashioned to provide hollow uprights or standards 2, 2$^a$, extending longitudinally thereof, preferably in alignment, but spaced from each other to provide room for a work holder or chuck, indicated as an entirety at 3. The inner ends of the uprights 2, 2$^a$, are connected by a rearward offset portion, shown at 4, in Figs. 4, 6 and 7, to form a back which cooperates with an extension 6 on the front portion of the base section 1$^b$ and centrally thereof to provide a support for an annular stationary chuck bearing member 5 (see Figs. 2, 3, 4, 6 and 7). The bearing member 5 is secured to the offset portion 4 as well as the extension 6 in any desired manner.

Forward of the uprights 2, 2$^a$, and mounted on the upper base section 1$^b$ are auxiliary base sections 2', 2$^a{}'$, secured to the base section 1$^b$ in any suitable manner, and having inner upright portions positioned against the uprights 2, 2$^a$ respectively (see Figs. 2 and 3). The upper ends of the upright portions are cut away along their inner faces longitudinally from end to end or otherwise shaped to provide longitudinally extending bars or plates 7 in parallel spaced relation to the opposing faces of the uprights 2, 2$^a$. 8, 8 indicate a pair of guides having depending portions 8$^a$ which adjustably or movably fit within the spaces between the plates 7 and uprights (see Figs. 2 and 3). The guides are provided on their outer sides with ribs 8$^b$ which form the guide rails, respectively, for a tool slide, indicated as an entirety at 9, and a pilot slide, indicated as an entirety at 10 (see particularly Figs. 1 to 5). The guides 8 may be disposed in any plane, be it angular, horizontal or vertical, but in this instance they are disposed in a vertical plane parallel to the axis of the chuck 3 and they are adjustable in that plane to varying positions for a purpose which will later appear.

The upper inner portions of the slides 9, 10 are fashioned to form grooves to receive the guide rails 8$^b$ and the free edge of each slide on its inner side is provided with a removable strap 11 which slidably fits a way or groove in the rail to interlock the slide thereto (Figs. 2 and 3). The lower portions of the slides have bearing between the forward faces of the upright portions of the auxiliary base sections 2' and 2$^a{}'$ and rails 7$^a$ provided on the outer portions of the base sections 2', 2$^a{}'$. Adjustable gibs carried by the rails are preferably provided between the rails and the slides.

The means for adjustably securing each of the guides to the adjacent upright 2, 2$^a$ may comprise elongated slots formed in one part and threaded studs or equivalent means carried by the other part and extending through the slots and arranged to take nuts, which, when tightened, clamp the parts together. In the preferred construction, as shown, I form a plurality of elongated slots 12 in the upper portion of each guide 8$^b$ and also in the adjacent plate 7 (see Figs. 1 and 5) and provide on the adjacent upright and depending portion studs 13 the outer ends of which are threaded to take nuts 14 which, when tightened, rigidly secure the guide to the upright in the desired position of adjustment.

In my construction, I provide a compound tool comprising two tool carrying members extending side by side and preferably disposed equal distances from an imaginary line extending longitudinally thereof. When the guides are positioned as shown in Fig. 1, this imaginary line coincides with the axis of the chuck, this line of coincidence being indicated by the dot and dash line $x$ in Fig. 16, but when the guides are adjusted, for example, to the position shown in Fig. 5, the tool slide 9 is adjusted upwardly and the pilot slide 10 is adjusted downwardly to inclined positions so that this imaginary line, indicated at $x'$ in Fig. 16, will intersect the axis of the chuck midway between its ends or the point of intersection of such axis by a plane at right angles thereto disposed midway of the chuck ends, as indicated at $x''$ in Fig. 16. 15 indicates as an entirety means for adjusting the guides 8, these means being connected so that both guides are adjusted simultaneously. The adjusting means 15 will be later described.

The chuck bearing member 5, which may be of sectional construction, is provided with a pair of spaced rings 16 (see Figs. 3, 5 and 6) having V-shaped bearing walls fitting complementary annular grooves formed in the periphery of the chuck 3, so that the latter may rotate in a plane extending transversely of the frame 1 and about an axis, preferably extending horizontally, as shown. The chuck 3 comprises an annular body $3^a$ having pairs of related ring sections $3^{a'}$ to provide the complementary V-bearing grooves. The body $3^a$ is provided around its inner wall with a plurality of jaws $3'$, which are movable inwardly and outwardly, that is, radially, by suitable mechanisms, indicated as an entirety at 17, whereby the work A, such as an annular member or coupling, may be removably mounted within and centrally of the body $3^a$ with its axis coinciding with the axis of the chuck 3. These jaw operating mechanisms 17 are operated by a suitable removable tool B which is shown in operating position in Fig. 6, extending through a sleeve $b$, mounted in the front portion of the bearing member 5.

No claim is made herein to the construction of the chuck 3 and the mechanisms for operating the jaws $3'$ thereof, as the same will form the subject matter of a separate application; and for the same reasons these mechanisms are not illustrated herein in detail. Nevertheless, it may be well to here state that the chuck may be otherwise constructed than herein illustrated. For example, I contemplate reversing the arrangement of the interfitting V-shaped portions by which the chuck 3 finds its bearing on the spaced rings 16. That is to say, instead of providing V-shaped bearing walls on the stationary chuck supporting member and complementary V-shaped bearing grooves in the rotating part, the V-shaped bearing walls may be in the rotating part and the bearing grooves in the outer supporting part. I prefer this as it facilitates lubrication.

Figure 6:
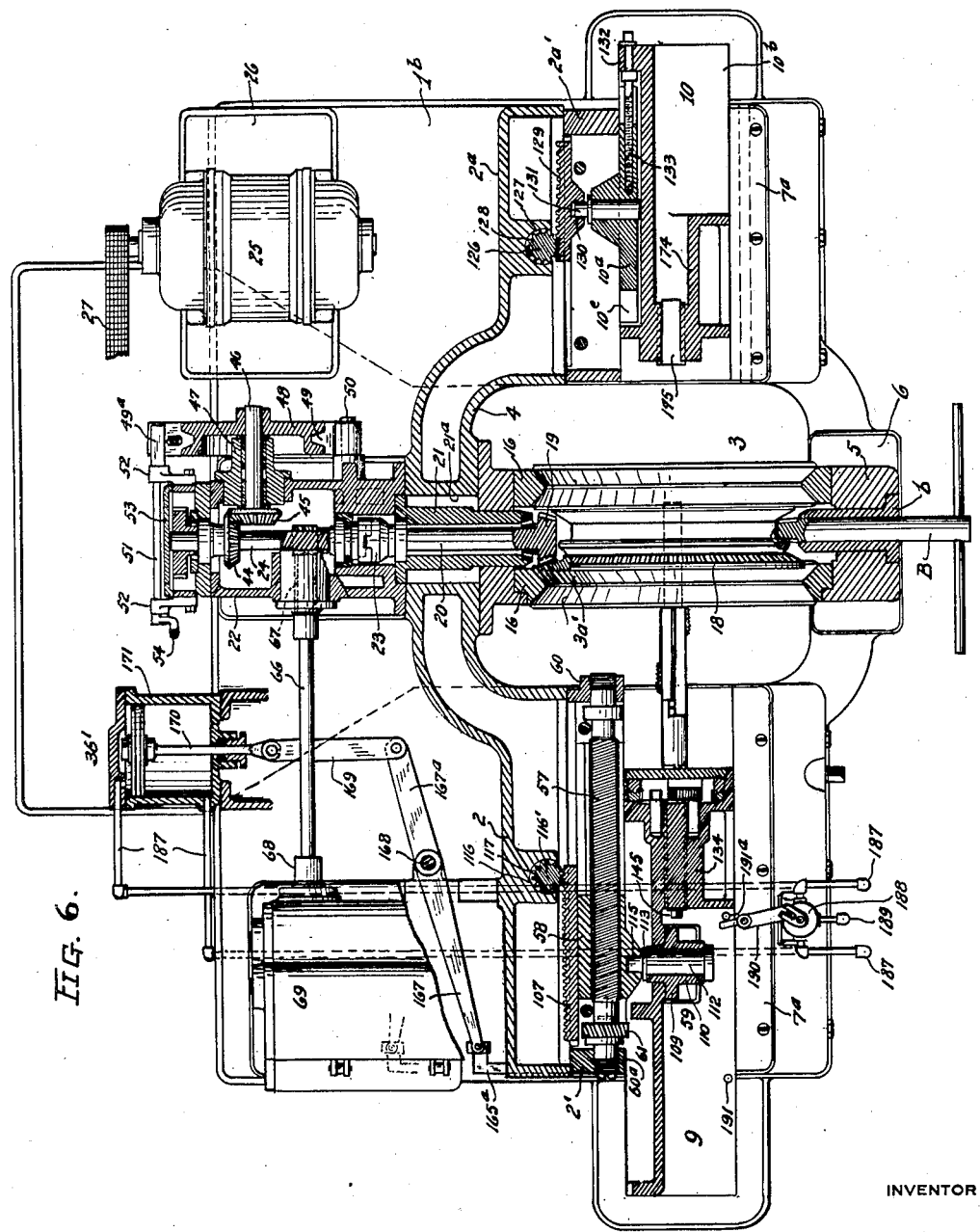
Fig. 6 is a section on line 6—6 of Fig. 7.

One of the inner rings $3^{a'}$ is provided with a ring gear 18 having beveled gear teeth meshing with a bevel pinion 19 (see Figs. 6 and 7), fixed to a driven shaft 20. The shaft 20 extends through a sleeve 21 mounted at its forward end in the bearing member 5 and at its rear end in the inner end wall of a suitable gear box 22, an opening $21^a$ being formed in the offset portion 4 of the base to accommodate the sleeve 21 and shaft 20 (Figs. 6 and 7). The sleeve carries at its opposite ends bearings for the shaft 20, the inner bearing serving to take the thrusts upon the pinion 19. The shaft 20 is connected through a clutch 23 with a driven shaft 24 mounted in bearings carried by the inner and outer end walls of the box 22. The shaft 24 is driven in one direction during the boring operation and preferably at a slower speed, in the opposite direction, during the thread cutting operation, the driving means for the shaft 24 comprising the following: 25 indicates the source of power, preferably an electric motor, mounted on a support 26. The motor shaft carries a suitable sprocket for a silent chain 27 which runs around a sprocket 28, fixed to a shaft 29, (Fig. 7), suitably mounted in the inner and outer end walls of the box 22. 30, $30^a$, indicate a pair of clutches, preferably of the disk type, each having an element fixed to the shaft 29 and an element 31 loosely fitting the shaft. Intermediate the clutches 30, $30^a$, the shaft 29 carries a control device 32, splined thereon and movable from a mid or neutral position into engagement with either clutch, whereby the adjacent element 31 will be connected to and driven by the shaft 29. The device 32 is provided in its outer wall with an annular groove into which fit pins 33 carried by a yoke 34. The yoke 34 is mounted on an arm 35 (Fig. 4) fixed to a rock shaft 36, the latter being mounted in the walls of a box $22^a$, fixed to one side wall of the box 22. The upper end of the shaft 36 carries an operating lever 37, whereby the operator may manually operate the device 32 in either direction and effect rotation of either clutch element 31. Each clutch element 31 is provided with a hub, one hub having fixed to it a spur gear 38 (Fig. 7) meshing with a spur gear 39 keyed to a counter or intermediate shaft 40 and the other hub having fixed to it a spur gear 41 meshing with an idler gear 42, (Figs. 7 and $7^a$) which in turn meshes with a gear 43 also keyed to the shaft 40. The idler 42 is suitably mounted on a shaft carried by the adjacent end wall of the box 22.

From the foregoing description it will be noted that when the shaft 29 is connected to the clutch 30 to drive the gear 38, the shaft 40 is driven in one direction (preferably that direction of rotation required during the boring operation) and that when the shaft 29 is connected to the clutch $30^a$ to drive the gear 41, the interposed idler 42 will effect rotation of the shaft 40 in the opposite direction (that direction required during the thread cutting operation), the ratio of these gears preferably being such that the speed of the shaft 40 will be slower when driving in this latter direction.

The lower end of the shaft 36 carries a supplemental lever $36^a$ (Fig. 4) actuated by means indicated as an entirety at $36'$ (Figs. 2, 4 and 6) to rock the shaft 36 automatically, to reverse the direction of rotation of the shaft 24 when the slide 10 reaches its limit of movement in one direction to rotate the chuck 3 in the opposite direction and to move the slide to its starting position, as will later appear. The automatic reversing means $36'$ will be later described.

The shafts 24 and 40 extend beyond the outer end wall of the box 22 and carry suitable change gears $24^a$, $40^a$, respectively, whereby varying ratios of speed reduction inversely proportional to the varying diameters of the work pieces or members A may be provided.

44 indicates a bevel gear fixed to the shaft 24 and meshing with a bevel gear 45 (Fig. 6) which is fixed to a shaft 46 mounted in a sleeve 47, the latter being mounted in one side wall of the box 22. The shaft 46 carries a brake wheel 48 with which engage and disengage brake shoes 49 (Figs. 4 and 6) having at corresponding ends knuckles each mounted on a stud shaft 50, the latter being carried by the adjacent side wall of the box 22. The shoes 49 are acted upon by a spring in a well known manner to normally maintain them in engagement with the wheel 48. Between the opposite ends of the shoes 49 is a double cam $49^a$ arranged, when rocked or operated, to spread the shoes and hence cause them to disengage the wheel. The cam $49^a$ is carried at one end of a rock shaft 51, suitably mounted in brackets 52, the latter being supported by walls of a casing 53 enclosing the change gears $24^a$, $40^a$. The opposite end of the rock shaft 51 has secured to it an arm 54 and the free end of this arm is pivotally connected to one end of a link 55, the opposite end of which is pivotally connected to a lever 56, which is fixed to the shaft 36 (see Fig. 4). By connecting the lever 56 to the shaft 36, it will be seen that operation of the lever 37 in either direction will effect operation of the brake; that is, when the lever 37 is moved into either of its clutch operating positions, the operating connections to the brake will operate its cam and cause a disengagement of the brake shoes 49 from the wheel 48 and when the lever is moved to its mid or neutral position the cam will permit the shoes to engage the wheel 48 under the influence of the shoe operating spring and stop it, thus preventing overrun or coasting of the chuck and other parts when the power to the shaft 24 is cut off.

In my construction, the tool slide 9 and pilot slide 10 are movable on the guide rails 8b, preferably toward each other simultaneously and away from each other simultaneously. When moved toward each other the pilot slide engages and supports the tool pilots (there being two pilots and two tool supporting members, as will later appear) and supports the latter during the operation of the tools (see Fig. 5); when the slides 9, 10, are moved away from each other to the limit of their movements (see Figs. 1, 4 and 6), ample room is provided for the positioning of the work-piece A, its removal and the removal of the tool elements or their adjustment. Also, and by preference, the pilot slide 10 is connected to the tool slide in such manner that the movement of the latter serves to effect the simultaneous movement of the former, but in the opposite direction relative thereto, as above described. The operating connections between the slides 9, 10, will be later described.

The tool slide 9 is moved relative to the work, first in one direction to effect (in this instance) boring of the work A and then in the opposite direction to effect threading thereof, by means of a feed screw 57 engaging a nut 58 which has connection, as indicated as an entirety at 59, with the slide 9, (see Fig. 6). The feed screw 57 is rotatably mounted at its opposite ends in bearings 60, 60a, provided in the walls of the adjacent supplemental base section 2' (Fig. 6) and suitably held therein against endwise movement. Near its outer end, the screw 57 carries a helical gear 61 which meshes with a complementary gear 62 fixed to a shaft 63 (Figs. 8 and 9). The shaft 63 is preferably of sectional form for a purpose to be later explained. The shaft 63 is driven in one direction or the other by a suitable driving mechanism, preferably from the chuck driving shaft 24, and while so driven, the rate of feed or traverse of the slide in either direction will have a definite relation to the speed of the shaft 24 and the surface speed of the work piece A carried by the chuck 3. The shaft 63 may, however, be driven independently of the chuck driving shaft. The driving mechanism here shown consists of a gear train 76 through which the shaft 63 is driven to rotate the feed screw at the desired speed for feeding the tool slide at a predetermined rate of speed for boring, and a gear train 77 through which the shaft 63 is driven to rotate the feed screw in the opposite direction for feeding the tool slide at a different, predetermined rate of speed (faster) for threading the work piece, and, by preference, each gear train is of the selective type, whereby the rate of feed of the slide 9 in either direction may be changed according to the size of the work piece or the pitch of the threads to be provided thereon, or both the size and thread pitch.

Referring to the driving mechanism for the shaft 63, 64 indicates a helical gear fixed to the shaft 24 and meshing with a complementry gear 65 fixed to the inner end of a shaft 66. The inner end of the shaft 66 is suitably mounted in a bearing member 67 (Fig. 6) supported in the adjacent side wall of the gear box 22; its outer end is mounted in a suitable bearing member 68 supported in the inner side wall of a gear box 69 (Fig. 10). At its outer end and within the box 69 the shaft 66 has secured to it a helical gear 70 (Figs. 9 and 10) meshing with a complementary gear 71 loosely and slidably mounted on a jack shaft 72. The opposite ends of the gear 71 are provided with suitable clutch teeth or jaws 73, 73a, adapted when the gear 71 is moved endwise in either direction to engage complementary teeth or jaws provided on clutch members 74, 74a, respectively.

The clutch member 74 is provided on the inner end of the hub with a gear 75 whereas the clutch member 74a is fixed to the jack shaft 72; the clutch members 74, 74a, being spaced from each other a sufficient distance so that the teeth or jaws 73 will be out of engagement with the clutch member 74 when the teeth or jaws 73a are engaged with the clutch member 74a, and vice versa. When the teeth 73 on the gear 71 engage the clutch member 74, the gear 75 will be driven and this gear in turn through the selective gear train 76 (presently to be described) will rotate the feed screw 57 in that direction required to feed the slides 9, 10, to effect boring of the work A, namely, toward each other; when the teeth 73a on the gear 71 engage the clutch member 74a, the jack shaft 72 will be driven in the opposite direction and this shaft in turn through the selective gear train 77 (presently to be described) will rotate the feed screw 57 in that direction required to effect feed of the slides 9, 10, for threading the work A, namely, away from each other. The gear 71 being freely rotatable and slidable on the jack shaft 72, the helix angle of the spiral of the gears 70, 71, will, when the shaft 66 is driven in either direction, effect a thrust movement upon the latter gear and hence cause it to roll and slide into engagement with one or the other clutch member 74, 74a, according to the direction of rotation of the shaft 66. As already described herein, the shaft 66 being driven by the shaft 24, it may be driven in either direction upon movement of the device 32 into engagement with either clutch 30, 30a, by operation of the lever 37.

The jack shaft 72 is suitably mounted at its inner end in a bearing carried by the inner end wall of the box 69; the outer end of the jack shaft extends through and has bearing in the hub of the gear 75, this hub being extended and suitably mounted for rotation in a bearing 78 provided on the outer end wall of the box 69; whereas the intermediate portion of the jack shaft may be mounted in a bearing 79 supported in a bracket 80 in the box 69, (see Fig. 8).

When the shaft 66 is driven in the direction to effect feed of the slides 9, 10, for the boring operation, the drive takes place through the gears 70, 71, and clutch 74 to the gear 75. The gear 75 meshes with a gear 81 fixed to a shaft 82 mounted at its opposite ends in the outer end wall of the box 69 and the bracket 80. 83 indicates a yoke member adapted to swing about the axis of the shaft 82 and also slide longitudinally thereof. Between its side members, the yoke carries a gear 84 splined to the shaft 82. Near its outer end the yoke side members support a shaft 85 on which loosely rotates a gear 87 in mesh with the gear 84. By swinging the yoke 83 about the axis of the shaft 82 and sliding it and the gear 84 endwise therealong the gear 87 may be positioned in driving engagement with any one of the stepped gears 88 and through such selected gear drive the rear section 89 of the shaft 63, to which section the gears are suitably keyed (see Fig. 9), the shaft section 89 being connected to the forward section 89' of the shaft 63 in the manner to be later set forth.

Accordingly, if the device 32 has been moved to effect operation of the clutch 30 and rotation of the chuck 3 in the boring direction, the shaft 66 will, through the gears 70, 71, effect engagement of the teeth 73 with the clutch 74 to drive the gear 75, which through the gear train 76 just described will rotate the feed screw in the required direction and at the predetermined or selected rate of speed in relation to the surface speed of the work A.

When the direction of rotation of the shaft 66 is reversed and the gear 71 is rolled and slid endwise to effect its connection with the clutch member 74ª, the rotation of the feed screw in the opposite direction is effected by the gear train 77 as follows: 90 indicates a gear fixed to the jack shaft 72 and meshing with a gear 91 fixed to a shaft 92. The inner end of the shaft 92 preferably extends through the hub of the gear 91 and such hub is rotatably mounted in suitable bearings carried by the inner end wall of the gear box 69. The outer end of the shaft 92 is enlarged and rotatably mounted in a bearing 93 supported by the bracket 80 and such enlarged end is hollowed out to receive and rotatably support the adjacent end of the shaft 82, these shafts 92, 82, being, by preference, in axial relation. 94 indicates a yoke adapted to swing about the axis of the shaft 92 and also slide longitudinally thereof. Between its side members, the yoke 94 carries a gear 95 suitably splined to the shaft 92. Near its outer end, the yoke side members support a shaft on which loosely rotates a gear 96 in mesh with the gear 95. By swinging the yoke 94 about the axis of the shaft 92 and sliding it and the gear 95 endwise therealong the gear 96 may be positioned in driving engagement with any one of the stepped gears 98 and through such selected gear drive the shaft section 89, to which they are suitably keyed (see Fig. 9) whereby the shaft 63 will rotate the feed screw in the required direction and at the predetermined, selected rate of speed.

Each yoke 83, 94, extends through an opening 69ª formed in the outer side wall of the gear box 69 and carries on its outer end a pivoted member 98' which may be locked or sealed to the side wall after the adjacent gear (87 or 96) has been engaged with one of the adjacent stepped gears as already described, to prevent unauthorized persons from changing the setting of the gear trains.

The shaft section 89 is preferably detachably connected to the shaft section 89' by means of a suitable clutch 99, so that, upon disengagement of the clutch elements, the feed screw 57 may be rotated in either direction manually by mechanism best shown in Fig. 1ª, to longitudinally adjust the slides 9, 10, relative to the work A.

The mechanism preferably comprises a helical gear 100ª meshing with the gear 62, and fixed to one end of a shaft 100ᵇ, extending horizontally lengthwise through the base section 2' and carrying a helical gear 100ᶜ meshing with a helical gear 100ᵈ, fixed to a transverse shaft 100ᵉ, having its outer end extending to the front of the frame 1 and shaped to take a suitable tool (not shown) for rotating it. One element of the clutch 99 is provided on the inner end of a sleeve 89ª (Fig. 9) fixed to the shaft section 89 and carrying the stepped gears 98 as a unit. The other element of the clutch comprises a slidable collar 101 splined to the shaft section 89' and engaged and operated by a yoke 102, the latter being fixed to a rock shaft 103 which is rocked by a handle 104 (Figs. 2 and 4). The shaft section 89' is mounted in spaced bearings 105 supported in the opposite ends of a sleeve 106, which is suitably supported in an opening formed in the walls of the adjacent upright 2. The inner end of the shaft section 89' is preferably extended and has bearing in an axial opening formed in the adjacent end of the shaft section 89.

The nut 58 is guided in its movement in opposite directions by guides 58ª provided on the supplemental base section 2' and carries on its inner side or face a rack 107, the purpose of which will be later set forth. The connection 59 between the nut 58 and the slide 9 comprises the following: 108 indicates a vertically extending slot formed in the outer side of the nut 58 (see Fig. 27), 109 (Figs. 1, 6 and 9) indicates a fitting having angle portions fixed to the base and upright members of the slide 9. The walls of the fitting are thickened to provide a hollow boss 110 the inner end of which extends through an opening 111 formed in the upright member of the slide 9. 112 indicates a pin rotatably mounted in the boss 110, the inner end of the pin being reduced to form a shoulder against which is fixedly positioned a collar 113 arranged to engage the inner end of the boss 110. The outer end of the pin is threaded to take a nut 114, whereby the pin 112 is secured in the boss and held against endwise movement. The reduced inner end 115 of the pin 112 extends into the slot 108 and has sliding engagement with the walls thereof to permit of its vertical adjustment therein, such end 115 preferably having on its opposite sides flattened surfaces which slidably fit the side walls of the slot. By providing for rotation of the pin and its movement relative to the nut, it forms a flexible connection between the latter and the slide 9, so that when the guide rails 8ᵇ are adjusted at an angle to the axis of the work or the point of intersection of a plane cutting such axis at right angles thereto, by the adjusting means 15, for a purpose to be later set forth, the connection permits the slide to be adjusted without affecting the feed thereof by the feed screw.

The operating connections between the slides 9, 10, comprise the following: 116 indicates a vertically extending opening formed in thickened walls of the upright 2 and forming a bearing for a shaft or spindle 116', the bottom of the opening serving as an end bearing therefor (Figs. 1 and 2). At its lower end the shaft or spindle is provided with gear teeth 117 which project through a lateral opening in the wall of the upright and mesh with the rack 107 carried by the nut 58. At its upper end, the shaft or spindle 116' is provided with gear teeth 118 which mesh with a rack 119 provided on the adjacent end portion of a reciprocating bar 120. As shown in Fig. 4, the upper ends of the uprights 2, 2ª, are formed with aligned longitudinally extending recesses 121, 121ª, the walls of which form guides for the bar 120, the recess 121 having a lateral portion 121' to accommodate the gear 118 and the opposite outer end walls of the recesses being spaced sufficiently to permit of the required movement of the bar 120. The opposite end portion of the bar is provided with a rack 122 which meshes with a gear 123, loosely mounted on a stud shaft 124 supported in the bottom wall of a lateral recess 121ª'. The gear 123 is provided on its lower face with a pinion (not shown) which meshes with the teeth 125 provided on the upper end of a shaft or spindle 126. The shaft or spindle 126 rotatably fits a vertically disposed opening 127 formed in thickened walls of the upright 2ª (shown in dotted lines in Fig. 3 and in full lines in Fig. 6). At its lower end, the shaft or spindle 126 is provided with gear teeth 128, which project through a cut-away in the adjacent wall and mesh with a rack 129. The rack is slidably mounted in suitable guides provided on the supplemental base section 2ª' and is moved in opposite directions by operating the connections just described. However, due to the provision of the intermediate gear (above referred to) between the rack 122 and spindle 126 the direction of movement of the slide 10 relative to the slide 9 is reversed, so that the slides move toward each other simultaneously, or away from each other simultaneously, as already set forth herein, and by preference the gears 123 and 125 serve as a gear reduction so that the traverse of the pilot slide 10 in either direction is less than that of the tool slide 9.

The inner side of the rack 129 has a thickened portion in which is formed a vertically extending slot 130 to slidably receive the inner end of a pin 131 which is rotatably mounted on the slide 10, (Fig. 6) this connection serving to permit of the vertical and angular adjustment of the slide 10 when the guide rails 8ᵇ are adjusted at an angle to the axis of the work A, or about the point of intersection of a plane cutting such axis at right angles thereto, as will be later set forth, by the adjusting means 15, for the same reasons already explained with reference to the connection 59.

The slide 10 preferably comprises two members 10ª, 10ᵇ, one (the latter) being adjustable relative to the other, whereby the pilot supporting member (10ᵇ) may be manually adjusted relative to the tool slide 9. For this purpose, the connecting pin 131 is carried by the relatively stationary member 10ª and the inner face of the upright portion of the member 10ᵇ is recessed, as shown at 10ᶜ, to receive the member 10ª, the walls of the recess cooperating with the adjacent face of the supplemental base section 2ª' to guide the member 10ᵇ when the latter is being adjusted. At its outer end, the slide member 10ᵇ is provided with a lug 132 formed with an opening in which is rotatably mounted the shank of a screw 133, the shank being provided on opposite sides of the lug with collars to prevent its endwise movement and also provided with a squared outer end to take a suitable tool (not shown). The screw 133 fits a threaded opening formed in the relatively stationary member 10ª, whereby rotation of the screw will effect adjustment of the member 10ᵇ relative to member 10ª.

It should be understood that the mechanism for operating the slide 10 may be other than herein shown, and, furthermore, that the mechanism which operates this slide may be such as to give it a variable movement in each direction. That is to say, it may be desirable that the slide have a quick movement approaching the work piece and later a quick movement in the opposite direction though it remain stationary or move relatively slowly during the actual machining operations.

134 indicates a head carried by the slide 9 and preferably formed integrally therewith. The head 134 supports the inner ends of tool carrying members 135, 136, each carrying a suitable tool element 137 to effect boring of the work A when the slide 9 is moving toward the right, as viewed in Figs. 1, 5, 6, and 11, and a suitable threading or thread chasing element 138 to effect threading of the bored out surfaces when the slide 9 moves in the opposite direction. Each tool carrying member may have a single boring tool or tool element 137, or two arranged side by side as here shown to divide up the cut. The thread chasing elements 138 are in this instance, but not necessarily, disposed on each tool carrying member at 90° relative to the boring tool elements, so that by rotating the tool carrying member a quarter turn, that is, the angular distance of 90°, either tool element is brought into active position, dependent on the direction of movement of the slide 9. The members 135 and 136 are arranged side by side and their axes are parallel to the direction of movement of slide 9.

I provide means for rotating both tool carrying members simultaneously to bring both boring tool elements 137 or both thread chasing elements 138 into active position. As the boring tool element 137 and the thread chasing element 138 on one tool carrying member are offset in the longitudinal direction relative to corresponding elements 137, 138, respectively, on the other tool carrying member, it will be understood that different portions of the work A are simultaneously bored or simultaneously threaded as the slide 9 moves in one direction or the other, whereby I am enabled to bore and thread both halves of the work A with one mounting thereof in the chuck 3.

The tool carrying members 135, 136, are preferably so mounted in the head 134 that their axes are disposed an equal distance from an imaginary line or axis, which either coincides with the axis of the chuck 3 (see line $x$ in Fig. 16) or which, in any adjustment of the guide rails 8ᵇ from such coincidence (see line $x'$ in Fig. 16) as provided for in my construction, intersects the axis of the chuck at the point of intersection of a plane at right angles to the chuck axis and midway of the chuck ends, such point of intersection being indicated at $x''$ in Figs. 11 and 16. When the guide rails 8ᵇ are adjusted so that this imaginary line or axis coincides with the axis of the chuck 3, the work will be bored cylindrically and provided with non-tapered threaded portions, but when the guide rails are adjusted (see Figs. 5, 11 and 16) so that this imaginary axis is at an angle to the chuck axis and intersects the axis at the point $x''$, the work will be taper bored in both halves and provided with tapered threaded portions. When the work-piece A is to be provided with non-tapered threaded portions, I may substitute other tool elements than those herein shown.

Each tool carrying member 135, 136, comprises an outer section 139, having its free end portion reduced to form a pilot 139', and an inner section 140 rotatably supported in the head in any desired manner. In one form of construction, as shown in Figs. 1, 4, 5, 11, 14 and 15, the sections 140 are rotatable or oscillatable, but non-adjustable longitudinally or laterally. In another form of construction, as shown in Fig. 19, the outer section for one of the tool carrying members is adjustable endwise of longitudinally, whereby its tool elements may be variously positioned relative to the tool elements, respectively, of the other member, as desired. In another form of construction, as shown in Figs. 20 to 24, inclusive, the inner sections 140$^x$ for both tool carrying members are adjustable toward or from each other to adapt the tool elements to work pieces of varying diameters. Referring to Figs. 11, 12, 13, 14, and 15; in this form of construction the inner section 140 rotatably fits an opening 141 formed in the head 134, or suitable bushings mounted therein. The section 140 is hollowed or bored to form an axial opening 142 through it and the outer portion of this opening is enlarged to form a relatively long seat 142$^a$. 143 indicates a relatively long shank removably fitting the seat 142$^a$. The outer end of the shank is secured by a pin in an opening 143' formed in the inner end of the adjoining outer section 139. By preference, the adjoining ends of the sections 139, 140, are provided with suitable interlocking elements 144 to lock them against rotative movement one relative to the other. 145 indicates a draw-bolt extending through the opening 142 in the section 140 and threaded into the shank 143 and serving to draw the section 139 inwardly into rigid, endwise relation with the section 140. The sections 139 of the tool carrying members 135, 136, (that is, those portions inwardly of the pilots 139'), are preferably of such size that their outer surfaces are in relatively close relation and substantially in contact. This arrangement permits each section 139 to support or reenforce the other against deflection or distortion, whereby danger of eccentricity or other inaccuracy in the resulting threaded portions of the work is eliminated. To reduce to a minimum danger of inaccuracies, the sections 139 are formed from solid stock material and rigidly secured to the sections 140 and the latter have long bearing in the head 134.

Each of the tool elements 138 is mounted in a radial slot 146 which connects with a longitudinally formed opening 146' (Fig. 11). 147 indicates a wedge slidably fitting the opening and arranged to engage the inner end of the tool element to adjust its cutting edge or edges. 148 (Fig. 11) indicates a device threaded in the outer portion of the opening 146' and connected to the wedge 147 for moving it in either direction. 149 indicates a set-screw for locking the tool element in its adjusted position, and 150 indicates a set-screw which serves as a key to guide the wedge and prevent its turning. Each of the tool elements 137 is mounted in a radial slot 146$^a$ and is adjusted radially by a screw 146$^b$ threaded into a suitable opening and engaging the rear inclined edge of the tool element (see Fig. 12). The tool element is held in its adjusted position by a set-screw 146$^c$.

The means for rotating or oscillating the tool carrying members 135, 136, are preferably actuated automatically by the reversing means 36' (Figs. 4 and 6), when the slide 9 moves to the limit of its movement in the work boring direction, so that in the return movement of the slide, that is, the work threading direction, the boring elements 137 are in an inactive position and the thread chasing elements 138 are in an active position; likewise, at the end of the threading operation, the reversing means 36' operate to automatically disengage the control device 32 from the clutch 30$^a$ and effect stoppage of the chuck shaft 24 and also to rotate the tool carrying members in the opposite direction to move the boring elements 137 into active position and the thread chasing elements 138 into an inactive position, whereby the former, upon the manual operation of the lever 37 to again set the machine in operation, will effect boring as the slide 9 moves forwardly in the boring direction. The means for oscillating the tool carrying elements comprise the following instrumentalities: 151 (Figs. 11 and 14) indicates gear segments, one fixed to each section 140 (preferably integral therewith) and arranged to mesh with arc-shaped racks 152, respectively, provided on a ring 152', which is revolubly mounted in a cup-shaped casing 153 provided on the head 134. The ring 152' has bearing on the bottom and side wall of the casing 153 and is held in such position by arc-shaped spacing elements 154 and the latter are held in the cup member 153 by a plate 155, secured to the head 134 by bolts 156; the plate being formed with openings through which the outer ends of the sections 140 extend. The spacing elements 154 are also secured to the ring 152' by screws and the abutting faces of the ring and the elements 154 are interlocked by tongue and groove elements 154$^a$. The inner side wall of the elements 154 also serves to lock the sections 140 against rotating or oscillating after being moved to either position in the manner to be later set forth.

As shown in Fig. 14, certain of the teeth of each gear segment 151 are cut off, preferably on an arc struck from the axis of the adjacent rack 152, so that the latter may revolve about its axis a predetermined distance before engaging and operating the gear segments. The tool carrying members 135, 136, are oscillated first from one position to the other and then back to their first position to position the tool elements 137, 138, as already described, a pair of stops 151' (Figs. 14 and 15) being disposed in their paths of movement to arrest the segments when oscillated in either direction. As shown in Fig. 15, the inner ends of the stops 151' fit openings formed in the head 134. In order to effect oscillation of the tool carrying members, each gear segment 151 has a full sized tooth 151$^a$ at each end and intermediate teeth 151$^c$. The teeth 151$^c$, starting at each end tooth, are, by preference, progressively longer, measured from the axis of the section 140, the center tooth 151$^b$ being the longest for a purpose to be presently explained. This arrangement permits each rack 152 to revolve around the adjacent gear segment 151 until its forward end tooth (in either direction of movement) engages the remote end tooth 151$^a$ on the gear segment before operating the latter. However, in order that each rack 152 may engage more than one tooth on the adjacent segment 151, the ends of the teeth 151$^c$ from the center tooth 151$^b$ to the end tooth 151$^a$ which the rack engages describe an arc struck from the axis of the rack 152. Accordingly, upon the engagement of the rack with the remote end tooth, the teeth 151$^c$ rearward thereof will progressively mesh with the rack as the segment continues to move about the axis of the section 140, thus insuring a positive rotation of the tool carrying member.

On its outer side and throughout a portion of its circumference, the rack ring 152' is provided with gear teeth 157 which mesh with a pinion 158. The pinion 158 is carried by a shaft 159 rotatably mounted in an opening 160 (or suitable bushings therein) formed in an extended portion of the head 134. To accommodate the pinion 158, the cup-shaped casing has a lateral portion 153ª and the plate 155 is extended to close such portion. The shaft 159 (Figs. 5, 11 and 14) is of the sectional type, its sections being connected by universal joints to allow for the adjustment of the slide 9 to varying positions as already set forth. The shaft 159 preferably extends longitudinally of the machine, its outer end having bearing in the side wall 2ˣ (Fig. 5) of the section 2' and a cover 161 removably secured to said wall. Between the wall 2ˣ and the cover 161, the shaft has splined to it a pinion 162 which meshes with a gear 163, the gear being mounted on a shaft 164 also mounted in the wall 2ˣ and cover 161. The gear 163 in turn meshes with a transversely reciprocatable rack 165 (Figs. 2 and 5) having a guide rib 166 slidably fitting a groove formed in the wall 2ˣ and held therein by the cover 161. The gear 162 is slidably connected to the shaft 159 to permit the latter to move with the slide 9 in opposite directions, the gear 162 being held against movement with the shaft by engagement with the wall 2ˣ and cover 161. For the purpose, the outer section of the shaft 159 is splined substantially from end to end and a feather in the gear slidably fits the spline.

The rack 165 has an extended end 165ª to which is pivotally and slidably connected one end of a lever 167 (Figs. 2 and 6) fixed to the lower end of a rock shaft 168 suitably mounted in vertical position on the inner side of the gear box 69. As shown in dotted lines in Fig. 2, the shaft 168 extends downwardly so that the lever 167 may be disposed in approximately the same plane as the extended end 165ª of the rack for ready connection therewith, the walls of the base section 1ᵇ being cut away, as shown in Fig. 6, to permit the lever to be positioned as above set forth. The inner end 167ª of the lever 167 (Fig. 6) is pivotally connected to one end of a link 169, and the opposite end of the link is pivotally connected to a piston rod 170 having its piston mounted in a suitable cylinder 171 forming part of the reversing means 36', already referred to.

The upper end of rock shaft 168 has connected to it a lever 172 (Fig. 4) to which is pivotally connected one end of a link 173, the opposite end of the link being pivotally connected to the arm 36ª (see Fig. 4). As the arm 36ª is connected to the rock shaft 36 (as already described), operation of the latter in either direction will effect rotation of the chuck shaft 24 in one direction and the feed screw in the corresponding direction and also operation of the instrumentalities just described to oscillate the tool carrying members 135, 136, from one position to the other, these instrumentalities being correlated with the driving means so that (1) the boring elements 137 will be in active relation to the work A when the feed screw is driven in the direction to move the slide 9 forwardly and (2) the threading elements 138 will be in active relation to the work when the feed screw is driven in the opposite direction.

The slide 10 is provided with a head 174 preferably formed integrally with the walls of the slide member 10ᵇ. The head 174 is formed with longitudinally extending openings receiving pilot bushings 175 in alignment with and adapted to receive and support the pilots 139' as the slides 9, 10, move toward each other, the spacing of the slides and their movement toward and from each other being so arranged that the pilots 139' are supported by the pilot supports throughout that portion of the travel or feed of the slides toward each other or away from each other during which the pair of tool elements employed in each such movement is in active engagement with the work A. By providing the tool carrying members 135, 136, with pilots 139' at their outer ends and supporting them, as just described, danger of the deflection of these members and resulting inaccuracy in the finished work is substantially eliminated.

Referring to the adjusting means 15 for the guides 8, 176 (Figs. 5, 16 and 17) indicates a shaft extending longitudinally of the supplemental base sections 2', 2ª', and having bearing in aligned openings formed in the walls 2ᵇ thereof, as shown in Fig. 16. By preference, the shaft 176 may comprise sections connected end to end by couplings 177 and one end of the shaft extends beyond the outer end wall of the adjacent base section and is provided with a squared end to take a suitable tool, whereby the shaft may be rotated. 178 indicates a series of vertically disposed jack screws rotatably mounted at their lower ends in bridge walls 2ᶜ of the supplemental base sections 2', 2ª'. I preferably mount two jack screws in suitable openings formed in each section wall 2ᶜ and space them apart as far as possible. Each screw 178 is provided above the bridge wall with a collar 179 fixed to the shank of the screw and this collar cooperates with the hub of a bevel gear 180, fixed to the lower end of the shank below the bridge wall to prevent endwise movement of the jack screw in either direction while permitting it to be rotated, the threads of the outer screws being right-hand and the threads of the inner screws being left-hand, but all having the same pitch. Each gear 180 is in mesh with a gear 181 fixed to the shaft 176, so that rotation of the latter will drive all of the gears 180 and effect simultaneous rotation of the jack screws 178. Due to the fact that the guides are adapted to be adjusted at an angle to the axis of the chuck 3 or work piece A, so that the imaginary line $x$ between the tool carrying members 135, 136, will, in any adjustment of the guides, intersect the point $x''$, the gears 180, 181, for rotating the several jack screws, have different ratios, respectively, dependent upon their distance from the point of intersection $x''$ in a longitudinal direction in order to rotate the jack screw at different rotative speeds to effect the correlated adjustment of the guides.

The threaded portions of the jack screws engage nuts 182, each of which is movably mounted, as will later appear, in the depending portion 8ª (Fig. 18) of the adjacent guide 8, the movable mounting of the nuts being desirable due to the angular adjustment of the guides. 184 indicates key devices mounted in recesses formed in the plates 7 and having vertically disposed keys 184ª each slidably fitting a groove formed in the opposing face of the adjacent nut, the keys serving to guide the nuts vertically during adjustment of the guides, but preventing movement thereof longitudinally of the machine. However, since the adjusting means 15 adjusts the guides to inclined positions, I provide for the resulting longitudinal movement of each guide relative to one adjacent jack screw and its nut by permitting (a) rotative movement of one nut 182 in each guide and (b) a combined rotative and sliding movement of the other nut in each guide. As shown in Fig. 16, each of the outermost nuts 182 consists of a circular disk fitting into a circular recess 183 formed in the depending portion 8ª of the guide whereby it may oscillate or rotate relative to the guide as the latter is adjusted, whereas the innermost nuts 182 are rotatively mounted in blocks 185 each of which slidably fits an opening 186 formed in the depending portion 8ª of the adjacent guide 8. Each block 185 being of less length than the distance between the end walls of its opening 186, longitudinal movement of the portion 8ª relative to the inner nut 182 is permitted during its adjusting operation.

In Fig. 16, the guides 8 are shown in their horizontal position, and in this position the slides 9 and 10 are supported so that the imaginary line $x$ between the tool carrying members is coincident with the axis of the chuck and work piece A, but by operation of the adjusting means, the guides will be adjusted so that this line will extend at an angle, as indicated at $x'$ and will intersect the chuck axis at the point $x''$, which is the point of intersection of a plane at right angles to the chuck axis midway between its ends. To effect this adjustment, the shaft 176 is rotated, causing a simultaneous rotation of the jack shafts 178 through the medium of the gears 180, 181. Due to a selection of varying ratios between the pairs of gears and the hand of the threads actuating the nuts, as already explained, there is imparted to the guides 8 movement as follows:—The left-hand guide controlling the slide 9 is moved in one direction at both ends but the outer end more than the inner; whereas the right-hand guide controlling the slide 10 is moved in the opposite direction at both ends, the outer end more than the inner, the rate and direction of movement being such that in any and all positions of their adjustment the guide rails, which control the plane in which the slides are fed relative to the axis of the work-piece, are parallel to such plane of feed movement and equidistant therefrom. By providing the proper ratios between the gears 180, 181, I am enabled to adjust the guides as above set forth by a single shaft or operating means.

In my illustrated form of construction, the two guides 8 are adjusted angularly by a single means about the point of intersection $x''$, but, if desired, the guides 8 may be rigidly connected and mounted to pivot about a point approximating the point of intersection $x''$. In this latter form of construction, variation of the position of the tool carrying members when the guides are adjusted may be compensated for by proper adjustment of the tool elements on the tool carrying members.

Fig. 1 shows the position of the slides 9, 10, ready to be set in operation to effect the boring and threading of the work-piece A, which is shown mounted in the chuck in Fig. 5. If now the lever 37 is operated to the position shown in Fig. 4, thereby connecting the clutch 30 to the driven shaft 29, the shaft 24 will drive the chuck in the boring direction and the shaft 24 in turn will drive the shaft 66; the shaft 66 operating through the gear 71, clutch member 74 and gear train 76, will drive the feed screw 57 in the corresponding direction, that is, to effect movement of the slides 9, 10, toward each other. In such slide movement, the tool boring elements 137, which, through the operating connections connected to the shaft 36, were positioned in active relation to the work-piece A, will bore the latter as shown in Fig. 11, that is, the element or elements 137, on one tool carrying member, will engage one end of the work-piece and effect boring inwardly a predetermined distance, and the element or elements 137 on the other tool carrying member will engage the work-piece at the predetermined distance from its opposite end and effect boring outwardly to such opposite end. Following the boring operation, the reversing means 36' (1) reverses the direction of rotation of the chuck and the direction of movement of the slides and (2) oscillates the tool carrying members 135, 136, to position the elements 137 in an inactive position and the threading elements 138 in active position; thereupon the threading elements 138 will thread the respective bored portions of the work-piece A during the movement of the slides away from each other. When the slides 9, 10, reach their outermost positions, the reversing means is again operated and cuts out the clutch 30ª and stops the machine.

The reversing means 36' comprises the following: the cylinder 171 already referred to, to which is connected, at opposite sides of the piston, pipes 187 for the supply of a suitable medium, such as compressed air. The pipes 187 lead to a valve mechanism 188 (Figs. 1, 4 and 6), to which is connected a pipe 189 leading from the source of compressed air supply. The valve mechanism is operated by a lever 190 having one end in the path of movement of tappets 191, 191ª (Fig. 6) carried by the slide 9. When the slide 9 approaches the limit of its movement in the boring direction, the tappet 191 will strike and operate the lever 190 and admit sufficient compressed air to one side of the piston to move the piston its full stroke and allow any air on its opposite side to bleed through suitable ports provided therefor in the valve mechanism. As the piston is connected to the lever 167 and the latter is connected through the shaft 168, link 173 and arm 36ª to the rock shaft 36, the control device 32 will be moved out of engagement with the clutch 30 and into engagement with the clutch 30ª. As a result of this operation, the directions of rotation of the chuck shaft 24 and feed screw 57 are reversed and the tool carrying members 135, 136, are oscillated a quarter turn. When the slide 9 approaches the limit of movement in the threading direction, the tappet 191ª will strike and operate the lever 190 in the opposite direction and cause the valve mechanism to admit a full supply of air to the cylinder 171 on the opposite side of the piston, to move the latter its full stroke in the opposite direction. This operation of the piston through the lever 167, extension 165ª and rack 165 will oscillate the tool carrying members 135, 136, but due to the provision of a slot and pin connection between the inner end of the link 173 and the arm 36ª, the latter will be moved only far enough to move the control device 32 to its mid position, the effect of which operation is to cut off power to the chuck driving shaft 24.

Reverting again to the construction in the tool head 134, 192 indicates lock plates, one secured by screws 193 to each gear segment 151. As shown in Fig. 14, each lock plate has two arc locking portions 194, 194ª, one of which engages the adjacent spacing member 154 in either position of the gear segment. It will be noted that each arc locking portion is struck on a radius equal to the radius of the spacing member 154 measured to its inner wall, so that in either position of the segment one locking portion 194 or 194a is concentric to the inner wall of the member 154 and its other portion 194a is eccentric thereto. Since the plate 192 oscillates about the axis of the adjacent tool carrying member, it will be seen that that locking portion 194 or 194a which is in engagement with the adjacent member 154 will engage the latter and lock the segment 151 against movement to its other position. By this form of construction, it will also be seen that the gear segments when in either position will be locked against movement in one direction by the members 154 and in the other direction by the stops 151', such as shown in Fig. 14. The spacing members 154 consist of two sections spaced from each other and each arranged relative to the adjacent rack 152, so that at or following the engagement of the latter with the remote tooth 151a of the gear segment, the rearward end of the member 154 clears the locking portion 194 and thus permits the segment to be operated as hereinbefore set forth.

Referring to Fig 19, in this form of construction one tool carrying member is adjustable endwise for the purpose of positioning the tool elements on one member in different relations to the tool elements, respectively, on the other member, as may be desired, for example, where the workpiece A is to be provided with a continuous threaded portion. Both tool carrying members 135', 136', of the modified construction shown in this figure, may be mounted for endwise adjustment, but it has been found that only one need be so mounted. To provide for this adjustment, the inner portion 140' of the adjustable tool carrying member has an opening 142' extending through it, which opening is enlarged to provide for two sleeves 142b, 142b' in endwise relation. The forward sleeve 142b is engaged by the inner end of the shank 143'. The outer wall of the sleeve 142b' is threaded and engages threads provided on the inner walls of the opening 142'. 145' indicates a draw-bolt extending through the sleeves 142b, 142b' and threaded at its forward end into the shank 143' of the tool carrying member 136'. The outer end of the draw-bolt carries a suitable head engaging the outer end of the sleeve 142b', so that when the bolt is turned, it draws the shank 143' into rigid relation to the abutting end of the sleeve 142b. By rotating the sleeve 142b' in the opening 142' it may be adjusted endwise therein to move or adjust the inner end of the sleeve 142b toward the right as viewed in Fig. 19, and hence effect endwise adjustment of the tool carrying member.

A lock nut 142c may be provided to lock the sleeve 142b' in its adjusted position. Ordinarily only a slight adjustment need be given to the adjustable tool carrying member 136'. Generally this adjustment need not be more than the fraction of the pitch of the thread so as to bring the thread cut by the threading tool of one tool carrying member in exact registration with the thread cut by the threading tool of the other tool carrying member. Therefore, the adjustment which is given to the outer portion of the tool carrying member is not enough to disengage the tongue and groove connection between the inner portion 140' and the outer portion of the tool carrying member 136'.

Referring to Figs. 20 to 26 inclusive, in this form of construction the head which is carried by the tool slide 9 is provided with a rectangular shaped casing 195. The opposite inner sides of the casing form guides for a pair of blocks 196, which may be adjusted into face to face relation, as shown in Fig. 23, or adjusted away from each other to varying spaced positions by interposing a spacing member 197 of any desired thickness between them, as shown in Fig. 24, the construction being such that the adjustment may be effected while retaining the oscillating means in connected relation to the tool carrying members. I provide front and back side straps 196b to hold the blocks in position in the casing and while being adjusted toward or from each other and these straps are provided with aligned key ways 196c to receive keys 196d, as will later appear, with which the blocks engage when adjusted as shown in Fig. 23 to insure their positioning equal distances from the imaginary axis x or x' (Fig. 16) according to the adjustment of the guides 8. For this purpose the blocks 196 are cut away along their side edges, as shown at 196e, to receive the keys 196d or the ends of the spacing member 197. When in any position of adjustment, the blocks are rigidly clamped together or against the interposed spacing member by clamping screws 198 mounted in the upper and lower walls of the casing 195.

The blocks 196 are suitably recessed to slidably support bars 199 (Fig. 20) which are provided (1) on their inner walls with racks 200, the purpose of which will later appear and (2) on their side walls with racks 201, the latter meshing with the gear segments 151x preferably formed integrally with the tool carrying sections 140x. 202 indicates a pair of locking bars fixed to each of the rack bars 199 by screws 203, the plates being spaced from each other to effect a locking of the gear segments 151x (as will later appear) after the latter have been moved to either position. 204 indicates cover plates formed with suitable openings through which the sections 140x extend. The cover plates are secured to the blocks by screws 204a (Fig. 24). The plates 204 are held in position by straps 205 which are secured to the walls of the casing by screws 206.

159x indicates the shaft which is oscillated by the rack 165 (Fig. 5), being suitably mounted in a bearing box 207 secured to the lower side of the rectangular casing 195 as shown in Figs. 20, 23 and 24. The inner end of the shaft 159x is provided with a miter gear 208 meshing with a miter gear 209 fixed to a shaft 210 which extends vertically through the head at one side of the center thereof, this shaft being shown in Figs. 20a and 23, and the lower portion only being shown in Fig. 20. The shaft 210 extends through the upper and lower walls 211, 211a of the casing 195 and also aligned openings formed in the blocks 196 and thus permit the adjustment of the latter without interfering therewith. The shaft 210 just above the gear 209 is provided with a spur gear 213 (Figs. 20 and 22) which meshes with a gear 214, suitably mounted on a shaft 214a carried by the wall 211a. The gear 214 meshes with a gear 215 fixed to a shaft 216, also mounted in the wall 211a of the casing. The shaft 216 extends upwardly into and rotatably fits a bored out recess 217 in the adjacent block 196, which recess is elongated as shown in Fig. 20 to permit adjustment of the block. The inner end of the shaft 216 is provided with gear teeth 218, which mesh with the adjacent rack 200 to reciprocate the latter when the shaft 159x is operated. The teeth 218 extend longitudinally of the shaft 216 to permit movement of the rack bar 199 with the adjacent block 196 when the latter is adjusted.

The opposite end of the shaft 210 has fixed to it a gear 219 (Figs. 21 and 23) which meshes with a gear 220, fixed to a shaft 221, suitably mounted in the upper wall 211 of the casing 195. The shaft 221 rotatably fits a recess 222 formed in the adjacent block 196, which recess is elongated to permit adjustment of the block. The inner end of the shaft 221 is provided with teeth 223 which mesh with the adjacent rack 200 to reciprocate the latter when the shaft 159$^x$ is operated. As shown in Figs. 20 and 23, the teeth 223 are elongated to permit movement of the adjacent rack bar 199 with its supporting block 196, when the latter is adjusted.

From the foregoing description it will be understood that when the shaft 159$^x$ is rocked or oscillated, it will rock the shaft 210, which in turn, through the gearing (213—214—215—216—218—200 and 219—220—221—223—200) will move the rack bars 199 in opposite directions and the latter, through the racks 201 and gears segments 151$^x$, will oscillate the tool carrying members 135$^x$, 136$^x$, about their axes. 224 indicates stops carried by each block 196 for limiting the movement of each gear segment 151$^x$ in either direction and adapted to serve as rigid abutments therefor, the stops being so positioned that the tool carrying members move through an angle of approximately 60°. When the stops 224 are so arranged, the tool elements on each tool carrying member are disposed 60° apart about the axis of the latter. 225 indicates a locking plate carried by each gear segment 151$^x$. The outer edge of each plate is provided with locking surfaces disposed at angles to each other, one thereof being engaged by the adjacent locking plate 202 when oscillated to either position, as shown in Fig. 23.

The teeth on each gear segment 151$^x$ are arranged and constructed substantially similar to the teeth on the segments shown in Fig. 14, so that the forward tooth of the rack (when moving in either direction) will engage the remote end tooth of the segment. By this arrangement, the locking plate 202 is freed from the locking plate 225 before movement of the gear segment 151$^x$ is effected.

To adjust the blocks 196 away from each other from the position shown in Fig. 23, the clamping screws are loosened, then the blocks are separated sufficiently to admit between them a spacing member 197 of the desired thickness. The spacing member 197 has a width equal to the interior width of the casing. The upper and lower edges of the member along its opposite sides are cut away to form keys 197$^a$, which fit the key-ways 196$^c$ in the straps 196$^b$, so that the spacing member will be supported in midposition with its upper and lower faces equidistant from the imaginary axis. Accordingly, the walls of the key-ways 196$^c$ will serve to center the spacing member. After the spacing member is positioned, the blocks 196 are moved into engagement with it and the screws 198 tightened. By the construction just described it will be seen that in any adjusted position of the blocks 196, the tool carrying members will be equidistant from the imaginary axis.

When provision is made for adjusting the tool carrying members toward or from each other, as shown in Figs. 21 to 24 inclusive, the pilot slide is provided with correspondingly adjustable pilots.

In the operation of my machine I first mount in the chuck an annular member or coupling that is to be bored and threaded, positioning the member or coupling midway between the ends of the chuck and with its axis coincident with the axis thereof. With the boring elements 137 on the respective tool carrying members in active position, the lever 37 is operated to connect in the power to the chuck driving shaft 24 to rotate the chuck and through this shaft rotate the feed screw to move the slides 9, 10, toward each other to effect the boring operation, thereby cutting away the excess metal throughout the respective portions of the work-piece A, as shown in Fig. 11. Next, the reversing means are caused to operate automatically to oscillate the tool carrying members to bring the threading elements 138 into active relation to the work, to reverse the direction of rotation of the chuck shaft and to reverse the rotation of the feed screw whereby the slides move away from each other and the threading elements engage the work-piece throughout their respective portions and cut the desired threads therein, thereby carrying out the final step of my process.

From the foregoing description it will be noted that the work-piece is bored and threaded with one mounting of the work-piece in the chuck, thereby insuring greater accuracy and concentricity as well as less labor and time in remounting the work-piece. By adjusting the guides to different angular positions the tool carrying members may be positioned for rectilinear movement parallel to any desired angular plane intersecting the axis of the work-piece at a point cut by a plane extending at right angles thereto and midway between the ends of the work-piece, thereby providing taper bored portions and threads on such portions.

It will also be noted that the stops for the gear segments 151 are positioned to resist the cutting action of the tool elements as the work-piece revolves. The stops, being firmly supported in the tool slide head, adequately serve as rigid abutments. Furthermore, in my construction the feed screw is mounted in one base section of the frame. The screw and consequently the direction of movement of the nut actuated thereby is therefore always parallel to the axis of the work-piece, irrespective of the angular adjustment of the guides and angular plane of movement of the slides, so that the threads generated by the threading elements will always have the correct pitch in any adjusted position of the slides. My process permits the boring and threading of annular members with relatively great speed, as well as with great accuracy.

It will also be noted that the chuck herein shown is open at both ends, thus permitting the insertion and mounting of the work-piece from that end opposite to or remote from the tool supporting slide. As a result of this construction, I am enabled to materially reduce the travel of the tool slide and thus permit the frame to be proportionately shorter in length.

To those skilled in the art to which my invention relates, many changes in construction and widely differing embodiments and applications of the invention will suggest themselves without departing from the spirit and scope thereof. My disclosures and the description herein are purely illustrative and not intended to be in any sense limiting.

Having thus described my invention, I claim:

1. In a machine tool, a frame, a work holder, a tool supporting slide and a piloting slide on opposite sides of the work holder, means for moving the two slides toward the work holder and then away from the work holder, and a tool carried by and moving back and forth with the tool supporting slide and having supporting relation with the piloting slide throughout the cutting operation.

2. In a machine of the class described, a support, a work holder mounted thereon and adapted to support a work piece, slides on said support at opposite sides of said work holder, a tool carried by one of said slides throughout the cycle of movement thereof and arranged to have supporting engagement with the other slide during engagement of the tool element with the work piece, means for feeding the tool carrying slide relative to the work piece, and means serving to move said supporting slide during movement of said tool slide in either direction.

3. In a machine of the class described, a support, a work holder rotatably mounted on said support and adapted to support a work piece, means for rotating said work holder, slides on said support at opposite sides of said work holder, a tool carried by one of said slides throughout the cycle of movement thereof and arranged to have supporting engagement with the other slide during engagement of the tool with the work piece, connections between said work holder rotating means and said tool carrying slide for feeding the latter relative to the work piece in relation to the speed of the work holder, and means serving to move said supporting slide in an opposite direction to the tool carrying slide during movement of the latter in either direction.

4. In a machine of the class described, a support, a work holder rotatably mounted thereon and adapted to support a work piece, means for rotating said work holder, slides on said support at opposite sides of the work holder, a tool carried by one of said slides and arranged to be supported by the other slide during engagement of the tool element with the work piece, connections between said work holder rotating means and said tool carrying slide for feeding the latter relative to the work piece in relation to the speed of the work holder, and operating connections between the slides serving to move said supporting slide in an opposite direction to the tool slide during movement of the latter in either direction.

5. In a machine of the class described, a support, a work holder rotatably mounted thereon and adapted to support a work piece, means for rotating said work holder, slides on said support at opposite sides of said work holder, a tool carried by one of said slides and arranged to be supported by the other slide during engagement of the tool element with the work piece, connections between said work holder rotating means and said tool carrying slide for feeding the latter relative to the work piece in relation to the speed of the work holder, operating means serving to move said supporting slide during movement of said tool slide in either direction, and means for adjusting one of said slides relative to the other without affecting its operating means.

6. In a machine of the class described, a support, a chuck rotatably mounted on said support and adapted to support a work piece, means for rotating said chuck, slides on said support at opposite sides of said chuck, a tool carried by one of said slides and arranged to have supporting engagement with the other slide throughout the engagement of the tool element with the work piece, and means for moving said slides simultaneously, the movement of the tool carrying slide being related to the speed of the chuck.

7. In a machine of the class described, a support, a chuck rotatably mounted on said support and adapted to support a work piece, means for rotating said chuck, slides on said support at opposite sides of said chuck, a tool carried by one of said slides and arranged to have supporting engagement with the other slide throughout the engagement of the tool element with the work piece, and means for moving said slides simultaneously toward each other and simultaneously away from each other, the movement of the tool carrying slide in either direction being related to the speed of said chuck.

8. In a machine of the class described, a support, a chuck rotatably mounted on said support and adapted to support a work piece, means for rotating said chuck, slides on said support at opposite sides of said chuck, a tool carried by one of said slides throughout the cycle of movement thereof and arranged to have supporting engagement with the other slide during engagement of the tool element with the work piece, connections between said chuck rotating means and said tool carrying slide for feeding the latter relative to the work piece in relation to the speed of the chuck, and means for moving the other slide simultaneously with said tool slide.

9. In a machine tool, a support, a chuck rotatably mounted on said support and adapted to support a work piece, means for rotating said chuck, slides on said support at opposite sides of said chuck, a tool carried by one of said slides throughout the cycle of movement thereof and arranged to have supporting engagement with the other slide during engagement of the tool element with the work piece, connections between said chuck rotating means and said tool slide for feeding the latter relative to the work piece in relation to the speed of the chuck, and operating connections between the slides serving to move said supporting slide during movement of said tool slide.

10. In a machine tool, a frame, a work holder, a tool holding slide and a piloting slide on opposite sides of the work holder, guides for the slides, means for moving the slides toward and then away from the work holder, and means whereby the guides may be simultaneously adjusted on the frame in opposite directions from the axis of the work holder.

11. In a machine tool, a frame, a work holder, tool supporting slides on opposite sides of the work holder, adjustable guides on the frame for the slides, means for moving the slides toward and then away from the work holder, and means for simultaneously adjusting the guides in opposite directions with reference to the axis of the work holder.

12. In a machine tool, a support, a chuck rotatable thereon about a fixed axis and adapted to support a work piece, slides adjustably mounted on said support at opposite sides of said chuck, a tool carried by one slide and adapted to have supporting engagement with the other slide throughout the cutting operation, means for moving said slides relative to the work piece, and means for adjusting said slides independently of said slide moving means and without affecting the connection of the slides therewith.

13. In a machine tool, a support, a chuck rotatable thereon about a fixed axis and adapted to support a work piece, slides adjustably mounted on said support at opposite sides of said chuck, a tool carried by one slide throughout the cycle of movement thereof and adapted to have supporting engagement with the other slide during the cutting operation, means for moving said slides relative to the work piece, and means for adjusting said slides simultaneously and independently of said slide moving means and without affecting the connection of the slides therewith.

14. In a machine tool, a support, a chuck rotatable thereon about a fixed axis and adapted to support a work piece, slides adjustably mounted on said support at opposite sides of said chuck, one of said slides being adapted to carry a tool throughout the cycle of movement thereof and another of said slides being adapted to support said tool during a portion of the movement of the tool slide, and means for moving said slides relative to the work piece, said slides being adjustable about a common axis to dispose them for movement along a line parallel to a line intersecting the axis of the chuck.

15. In a machine tool, a support, a chuck rotatable thereon about a fixed axis and adapted to support a work piece, a guide mounted on said support and adjustable to different angular positions relative to the axis of the chuck, a tool carrying slide engaging said guide, a device guided in a direction parallel to the axis of the chuck, means for reciprocating said device, and a connection between said device and said slide permitting the latter to be adjusted in varying positions at angles to the axis of the chuck.

16. In a machine tool, a support, a chuck rotatable thereon about a fixed axis and adapted to support a work piece, a guide mounted on said support and adjustable to different angular positions relative to the axis of the chuck, a tool carrying slide engaging said guide, a device guided in a direction parallel to the axis of the chuck, means for reciprocating said device, and a connection between said device and said slide permitting the latter to be adjusted in varying positions at angles to the axis of the chuck, said connection comprising a pin on one part and a slot on the other part forming a combined pivotal and slidable connection.

17. In a machine of the class described, the combination with a support and a chuck rotatable thereon about a fixed axis and adapted to support a work piece, of a pair of movable slide operating devices disposed at opposite sides of said chuck and guided on said support along lines parallel to the chuck axis, slides mounted on said support and adjustable to different angular positions relative to the axis of the chuck, means for reciprocating said devices, and a connection between each slide and the adjacent device permitting adjustment of the slide relative thereto without affecting the said connection.

18. In a machine of the class described, the combination with a support and a chuck rotatable thereon about a fixed axis and adapted to support a work piece, of a pair of movable devices disposed at opposite sides of said chuck and guided on said support along lines parallel to the chuck axis, slides adjustably mounted on said support, means for reciprocating one of said devices, operating means between the operated device and the other device, whereby the latter moves simultaneously therewith, and a connection between each slide and the adjacent device, said connection being arranged to permit adjustment of the slide.

19. In a machine of the class described, the combination with a frame and a chuck rotatably mounted thereon and adapted to support a work piece, of means for rotating said chuck, a pair of supports disposed upon opposite sides of the chuck, one of said supports carrying a tool element throughout the operative cycle of the machine and being movable relative to the work piece, means for moving said movable support, and means for adjusting said movable support about an axis disposed between said supports.

20. In a machine of the class described, the combination with a frame and a chuck rotatably mounted thereon and adapted to support a work piece, of means for rotating said chuck, a pair of supports disposed upon opposite sides of the chuck, one of said supports carrying a tool element throughout the operative cycle of the machine and being movable relative to the work piece, means for moving said movable support, and means for adjusting both said supports about an axis disposed between them.

21. In a machine of the class described, the combination with a frame and a chuck rotatably mounted thereon and adapted to support a work piece, of means for rotating said chuck, a pair of supports disposed upon opposite sides of the chuck, one of said supports carrying a tool element throughout the operative cycle of the machine and being movable relative to the work piece, means for moving said movable support, and means for adjusting said support about an axis disposed between said supports, said moving means being movable in a plane parallel to the axis of the work piece and being operatively connected with said movable support in all positions of adjustment thereof.

22. In a machine tool, the combination with a frame and a chuck rotatably mounted thereon and adapted to support a work piece, of means for rotating said chuck, a feed device movable in a direction parallel to the axis of the work piece, a guide adjustably mounted on said frame, a slide operatively connected with said feed device and arranged to be moved thereby along said guide, a tool element carried by said slide arranged to engage the work piece, and means for simultaneously adjusting the opposite ends of said guide different distances relative to the axis of the work piece.

23. In a machine tool, the combination with a frame and a chuck rotatably mounted thereon and adapted to support a work piece, of means for rotating said chuck, a feed device movable in a direction parallel to the axis of the work piece, a guide adjustably mounted on said frame, a slide operatively connected with said feed device and arranged to be moved thereby along said guide, a tool element carried by said slide arranged to engage the work piece, and means for simultaneously adjusting the opposite ends of said guide different distances relative to the axis of the work piece, said adjusting means comprising a pair of screws, one having a pivotal connection with said guide and the other having a slidable and pivotal connection with said guide and devices for rotating said screws.

24. In a machine tool, the combination with a frame and a chuck rotatably mounted thereon and adapted to support a work piece, of means for rotating said chuck, a pair of guides mounted on said frame at opposite sides of said chuck, slides movable along said guides, respectively, relative to the work piece, one of said slides carrying a tool element, and means for moving said slides, said guides being adjustable in opposite directions about a common axis angularly with reference to the axis of the chuck.

25. In a machine tool, the combination with a frame and a chuck rotatably mounted thereon and adapted to support a work piece, of means for rotating said chuck, a pair of guides adjustably mounted on said frame at opposite sides of said chuck, slides movable along said guides, respectively, relative to the work piece, one of said slides carrying a tool element, means for moving said slides, and a common adjusting means for simultaneously adjusting both said guides in opposite directions angularly with reference to the axis of the chuck.

26. In a machine tool, a work holder, a slide having a tool holder supported therein for rocking movement and adapted to carry a plurality of tools spaced circumferentially of the holder, means for moving the slide first in one direction and then in the other, and means operating in timed relation therewith for rocking the tool holder in the slide at substantially the point of reversal of the sliding movement thereby shifting one of the tools carried by said holder into cutting relation with the work piece and another of the tools out of cutting relation therewith.

27. A machine tool having a work holder, a slide having a tool holder mounted therein for rocking movement and adapted to carry a plurality of tools spaced circumferentially of the holder, means for moving the slide toward and from the work holder, and means operating in timed relation therewith and at substantially the point of reversal of the sliding movement for rocking the tool holder in the slide thereby shifting one of the tools carried by said tool holder into cutting relation with a work piece and another of the tools out of cutting relation therewith and for locking said member after said rocking movement.

28. In a machine tool, a frame, a work holder mounted thereon, a tool holding slide, a tool holder carried by the slide and mounted thereon for rocking movement and adapted to carry a plurality of tools spaced circumferentially of the holder whereby the positions of the tools carried by the holder may be changed relative to a work piece when the holder is rocked, and coordinated and interconnected mechanisms for rotating the work holder, for shifting the slide back and forth and for rocking said tool holder in the slide when the direction of movement of the slide changes to shift one of the tools carried by the tool holder into cutting relation with the work and another of the tools carried thereby out of cutting relation therewith.

29. In apparatus of the class described, the combination with a frame, a work holder mounted thereon and adapted to support a work piece and means for rotating said work holder, of slides mounted on said frame on opposite sides of said work holder, means for reciprocating said slides, a head on one of said slides, a pair of members carried by said head in parallel relation and carrying tool elements, respectively said members being piloted in another of said slides and being disposed on opposite sides of an imaginary line having a predetermined relation to the axis of the work piece, and means for rocking said members to bring tool elements carried thereby into and out of engagement with the work piece.

30. In apparatus of the class described, the combination with a frame, and a work holder mounted thereon and adapted to support a work piece, of slides mounted on said frame on opposite sides of said work holder, means for reciprocating said slides, a head on one of said slides, a pair of members on said head in parallel relation and carrying tool elements, respectively, arranged in different positions longitudinally of said members to engage different portions of the work piece, said members being piloted in another of said slides, and means for rocking said members to bring tool elements carried thereby into and out of engagement with the work piece.

31. In apparatus of the class described, a frame, a work holder mounted thereon and adapted to support a work piece, a guide adjustably mounted on said frame, a slide on said guide, a pair of members carried by said slide in parallel relation and carrying tool elements, respectively, arranged in different positions longitudinally of said members to engage different portions of the work piece, and means for rocking said members to bring tool elements carried thereby into and out of engagement with the work piece.

32. In apparatus of the class described, a frame, a work holder mounted thereon and adapted to support a work piece, means for rotating said work holder, a slide, a pair of members on said slide in parallel relation and carrying tool elements, respectively, said members being disposed at predetermined distances from an imaginary line angularly disposed with reference to the axis of the work holder and extending through the axis substantially at the point of intersection of a plane at right angles of the work holder midway between its ends, a mounting on said frame for said slide permitting the latter to be angularly adjusted thereon without changing the relation of said imaginary line to said point of intersection, and means for reciprocating said slide.

33. In apparatus of the class described, a frame, a work holder mounted thereon and adapted to support a work piece, means for rotating said work holder, slides at opposite sides of said work holder, a pair of members carried by one of said slides in parallel relation and carrying tool elements, respectively, and adapted to be supported by the other slide during a portion of the movement of said slides, said members being disposed predetermined distances from an imaginary line extending through the axis of the work holder substantially at the point of intersection of a plane at right angles thereto midway between its ends, mountings on said frame for said slides permitting the latter to be adjusted thereon without changing the relation of said imaginary line to said point of intersection, and means for reciprocating said slides.

34. In apparatus of the class described, a frame, a chuck mounted thereon and adapted to support a work piece, means for rotating said chuck, a slide, a pair of relatively adjustable members on said slide in parallel relation and carrying tool elements respectively, said members being disposed predetermined distances from an imaginary line extending through the axis of the chuck substantially at the point of intersection of a plane at right angles thereto midway between its ends, a mounting on said frame for said slide permitting the latter to be adjusted thereon without changing the relation of said imaginary line to said point of intersection, and means for reciprocating said slide.

35. In a machine of the class described, a frame, a work holder mounted thereon and adapted to support a work piece, a guide on said frame, a slide movable on said guide relative to the work piece, a pair of members rotatably mounted on said slide and carrying sets of tool elements, one element of each set being on each member and arranged so that one set will be in active relation to the work piece in one predetermined position of said members and the other set will be in active relation to the work piece in another predetermined position of said members, means for simultaneously rotating said members from either predetermined position to the other predetermined position, and means for moving said slide in opposite directions.

36. In a machine of the class described, a frame, a work holder mounted thereon and adapted to support a work piece, a slide on the frame, means for reciprocating the slide, a pair of members rotatably mounted on said slide and carrying sets of tool elements, one element of each set being on each member and arranged so that one set will be in active relation to the work piece in one predetermined position of said members and the other set will be in active relation to the work piece in another predetermined position of said members, and means for simultaneously rotating said members from either predetermined position to the other predetermined position, so that said members are in one position during movement of said slide in one direction and in their other position during movement of said slide in the opposite direction.

37. In mechanism of the class described, the combination with a frame and a chuck rotatably mounted thereon and adapted to support a work piece, of means for rotating said chuck, a guide on said frame, a support movable on said guide relative to the work piece, a pair of members mounted on said support for oscillatory movement between two working positions and carrying tool elements arranged to engage the work piece when in each working position, means for limiting the rotative movement of said members in either direction, and means for oscillating said members from one position to the other.

38. In mechanism of the class described, the combination with a frame and a chuck rotatably mounted thereon and adapted to support a work piece, of means for rotating said chuck, a guide on said frame, a support movable on said guide relative to the work piece, a pair of members mounted on said support for oscillatory movement between two working positions and carrying tool elements arranged to engage the work piece when in each working position, means for limiting the rotative movement of said members in either direction, means for oscillating said members from one position to the other, and means for locking said members in either position against said limiting means.

39. In mechanism of the class described, the combination with a frame and a chuck rotatably mounted thereon and adapted to support a work piece, of means for rotating said chuck, a guide on said frame, a support movable on said guide relative to the work piece, a pair of members mounted on said support for oscillatory movement between two working positions and carrying tool elements arranged to engage the work piece when in each working position, means for limiting the rotative movement of said members in either direction, and means for oscillating said members from one position to the other, and means for locking said members in either position against said limiting means, said locking means being automatically controlled by said oscillating means.

40. In mechanism of the class described, the combination with a frame and a chuck rotatably mounted thereon and adapted to support a work piece, of means for rotating said chuck, a guide on said frame, a support movable on said guide relative to the work piece, a pair of members rotatably mounted on said support carrying sets of tool elements, one element of each set being on each member and arranged so that one set will be in active relation to the work piece in one predetermined position of said members and the other set will be in active relation to the work piece in another predetermined position of said members, means for moving said support in either direction, and means controlled by said moving means to oscillate said members from one position to the other dependent upon the direction of movement of said support.

41. In mechanism of the class described, the combination with a frame and a chuck rotatably mounted thereon and adapted to support a work piece, of means for rotating said chuck, a guide on said frame, a support movable on said guide relative to the work piece, a pair of members rotatably mounted on said support carrying sets of tool elements, one element of each set being on each member and arranged so that one set will be in active relation to the work piece in one predetermined position of said members and the other set will be in active relation to the work piece in another predetermined position of said members, means for moving said support in opposite directions, said means including a reversing mechanism arranged to automatically reverse the moving means when said support reaches the limit of its movement in one direction, and means actuated by said reversing means to oscillate said members from one position to their other position.

42. In a machine tool, a frame, a chuck rotatably supported thereon and having its axis parallel to the axis of the frame, a tool slide adapted to carry a tool holder and a second slide adapted to pilot said tool holder and movable toward and away from each other and the chuck on opposite sides thereof, guides for the two slides supported by the frame and angularly disposed with reference to the axis of the frame with tool holding and piloting portions of the two slides in alignment with each other.

43. In a machine tool, relatively movable tool and work supports, said tool support having an oscillatable member adapted to carry a plurality of tools spaced circumferentially of the member, and automatic means for oscillating said member and for locking and unlocking it between each and for locking and unlocking it between each change in direction of its movement including a common actuator having actuating and locking portions operating successively.

44. In a machine tool, relatively movable tool and work supports, said tool support having a plurality of oscillatable members each adapted to carry a plurality of tools spaced circumferentially of the members, and means for oscillating said members and for locking and unlocking the same between each change in direction of their movements including a common actuator having locking and actuating portions operating successively.

45. In a machine tool, relatively movable tool and work supports, said tool support having an oscillatable member adapted to carry a plurality of tools spaced circumferentially of the member, and automatic means for oscillating said member and for locking and unlocking it between each change of direction of its movement including a rotatable actuator having locking and actuating portions operating successively.

46. In a machine tool relatively movable tool and work supports, said tool support having an oscillatable member adapted to carry a plurality of tools spaced circumferentially of the member, and means for oscillating said member and for locking and unlocking it between each change in direction of its movement including a slidable actuator having locking and actuating portions operating successively.

47. In a machine tool, relatively movable tool and work supports, said tool support having an oscillatable member adapted to carry a plurality of tools spaced circumferentially of the member, and automatic means for oscillating said member and for locking and unlocking it between each change in direction of its movement, including an actuator having locking and actuating portions, said member being provided with portions successively cooperating with the said portions of the actuator.

48. In a machine tool, relatively movable tool and work supports, said tool support having a plurality of oscillatable members each adapted to carry a plurality of tools spaced circumferentially of the members, and means for oscillating said members and for locking and unlocking the same between each change in direction of their movements including actuators each having locking and actuating portions operating successively and a common means for operating said actuators simultaneously.

49. In apparatus of the class described, a frame, a work holder mounted thereon and adapted to support a work piece, a slide mounted on said frame, means for reciprocating said slide, a pair of members on said slide and each member carrying a plurality of tool elements, respectively, and means for rocking said members to change the position of the tool elements on each member with reference to the work piece to bring one element out of cutting position and another element into cutting position.

50. In a machine tool, relatively movable tool and work supports, said tool support having an oscillatable member adapted to carry a tool, and means for oscillating said member and for locking and unlocking it between each change in direction of its movement including an oscillatable actuating mechanism having a toothed actuating portion and locking portions, said member having a toothed portion and a locking portion cooperating successively with the actuating and locking portions of the actuating mechanism.

51. In a machine tool, relatively movable tool and work supports, said tool support having a plurality of oscillatable members each adapted to carry a tool, and means for oscillating said members and locking and unlocking the same between each change in direction of their movements including an oscillatable actuating mechanism having toothed actuating portions and locking portions, said members having toothed portions and locking portions cooperating successively with the actuating and locking portions of said mechanism.

52. In a machine tool, relatively movable tool and work supports, said tool support having an oscillatable member adapted to carry a tool, and means for oscillating said member and for locking and unlocking it between each change in direction of its movement including an oscillatable actuating ring having a toothed actuating portion and curved locking portions, said member having a toothed portion and a locking portion cooperating successively with the actuating and locking portions of said ring.

53. In a machine tool, relatively movable tool and work supports, said tool support having an oscillatable member adapted to carry a tool, and means for oscillating said member and locking and unlocking it between each change in direction of its movement including an actuating mechanism comprising an oscillatable actuator and a slide having a toothed actuating portion and locking portions, said member having a toothed portion and a locking portion cooperating successively with the actuating and locking portions of the slide.

54. In a machine tool, relatively movable tool and work supports, said tool support having an indexible member adapted to carry tools spaced circumferentially of the member, and means for indexing said member and for locking and unlocking the same between each indexing movement including an actuating mechanism having a toothed actuating portion and locking portions, said member having a toothed portion and a locking portion cooperating successively with the actuating and locking portions of said mechanism.

55. In a machine tool, relatively movable tool and work supports, said tool support having a plurality of indexible members each adapted to carry tools spaced circumferentially of the members, and means for indexing said members and for locking and unlocking the same between each indexing movement including an actuating mechanism substantially surrounding said members and having a toothed actuating portion and locking portions, said members having toothed portions and locking portions cooperating successively with the actuating and locking portions of said mechanism.

FRED H. BOGART.